United States Patent [19]

Yamada et al.

[11] Patent Number: 5,192,942
[45] Date of Patent: Mar. 9, 1993

[54] IMAGING APPARATUS FOR DISPLAYING RELATED IMAGING PROCESSING FUNCTIONS

[75] Inventors: Yoshikado Yamada, Kashihara; Kimihito Yamasaki, Nara; Syoichiro Yoshiura, Yamatokoriyama; Kazuyuki Ogita, Nara; Osamu Iwasa, Kadoma, all of Japan

[73] Assignee: Sharp Kabushiki Kaisha, Osaka, Japan

[21] Appl. No.: 716,690

[22] Filed: Jun. 17, 1991

[30] Foreign Application Priority Data

Dec. 21, 1987 [JP] Japan ................................. 62-324802
Dec. 21, 1987 [JP] Japan ................................. 62-324804
Dec. 21, 1987 [JP] Japan ................................. 62-324805

[51] Int. Cl.⁵ ............................................. G09G 5/00
[52] U.S. Cl. ................................... 340/706; 340/712; 355/206
[58] Field of Search ................ 340/706, 710, 711, 712, 340/715; 355/206, 209; 364/523

[56] References Cited

U.S. PATENT DOCUMENTS

| Re. 32,253 | 9/1986 | Bartulis et al. | 355/209 |
|---|---|---|---|
| 3,960,445 | 6/1976 | Drawe . | |
| 4,017,173 | 4/1977 | Komori et al. . | |
| 4,281,920 | 8/1981 | Cross . | |
| 4,451,136 | 5/1984 | Taioka et al. . | |
| 4,627,707 | 12/1986 | Tani et al. . | |
| 4,707,110 | 11/1987 | Harada et al. . | |
| 4,714,941 | 12/1987 | Yamagishi et al. . | |
| 4,772,882 | 9/1988 | Mical | 340/710 |
| 4,799,081 | 1/1989 | Kikuno et al. . | |
| 4,885,704 | 12/1989 | Takagi et al. | 340/710 |

FOREIGN PATENT DOCUMENTS

| 0192119 | 8/1986 | European Pat. Off. . |
|---|---|---|
| 57-162649 | 4/1956 | Japan . |
| 56-83756 | 7/1981 | Japan . |
| 60-49360 | 3/1985 | Japan . |
| 60-1919329 | 9/1985 | Japan . |
| 61-53665 | 3/1986 | Japan . |
| 61-228472 | 10/1986 | Japan . |
| 62-185676 | 8/1987 | Japan . |
| 2187174A | 9/1987 | United Kingdom . |

Primary Examiner—Jeffery A. Brier

[57] ABSTRACT

An imaging apparatus has a plurality of image processing functions which can be classified at least into a first group including first related functions and a second group including second related functions. The imaging apparatus includes a display for displaying different information. When a special key for calling one of the first and second groups is activated, all the related functions which are included in the called group are displayed in the display. Then, another key is used for selecting one function from the related functions displayed by the display.

5 Claims, 31 Drawing Sheets

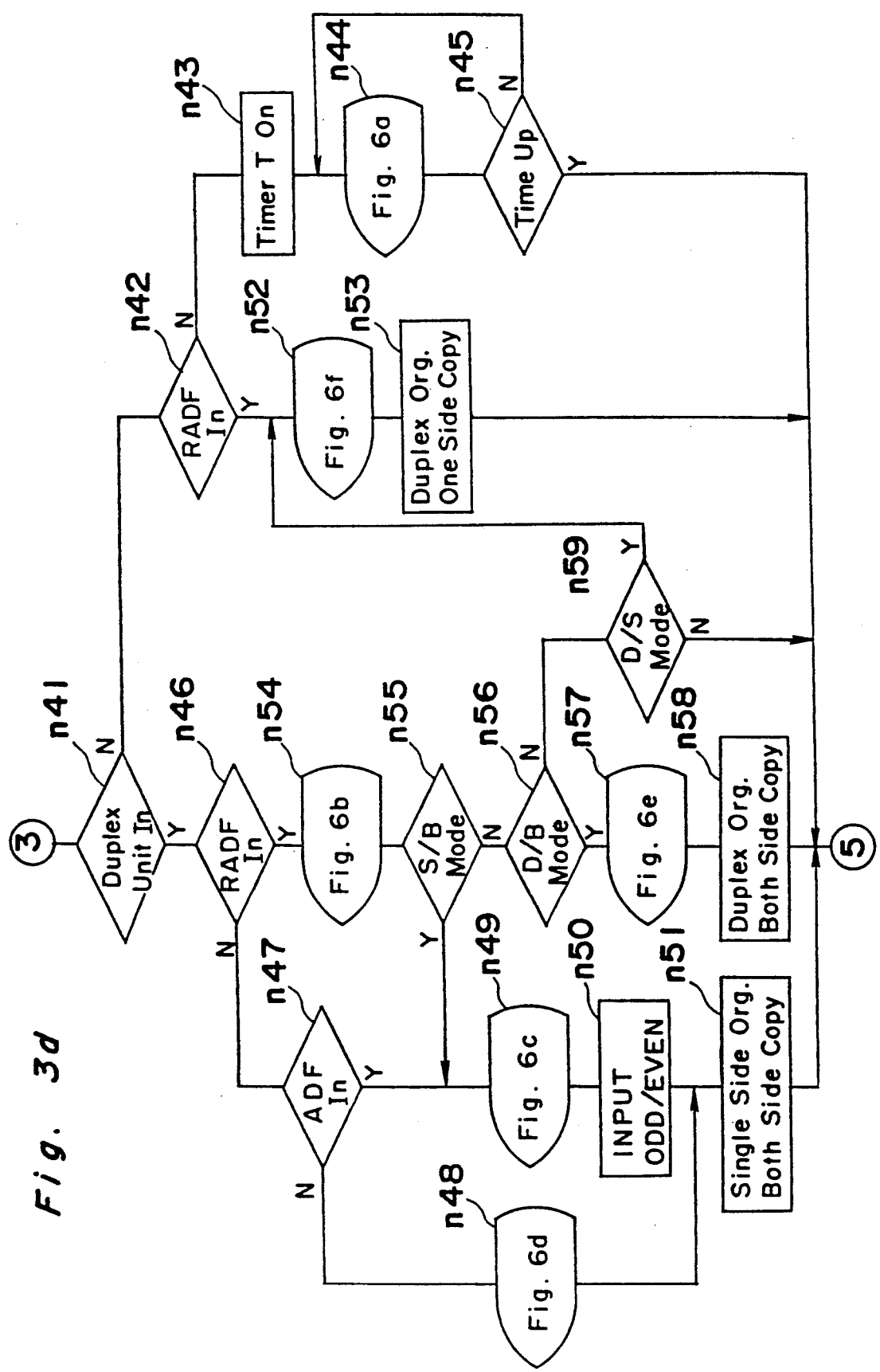

Fig. 6a

| Duplex Unit is Not Installed. | | |
|---|---|---|
| Auto Exposure | 100% | A 4 |
| Auto Paper Select | | A 4 |

Fig. 6b

| Select Duplex Mode. | | |
|---|---|---|
| Single→Both | Duplex→Both | Duplex→One |
| ⇨ | Enter | Cancel |

Fig. 6c

| Number of Originals ? | |
|---|---|
| Even | Odd |
| ⇨ | Enter | Cancel |

Fig. 6d

| Single→Both Mode is Selected. | | |
|---|---|---|
| Auto Exposure | 100% | A 4 |
| Auto Paper Select | | A 4 |

Fig. 6e

| Duplex→Both Mode is Selected. | | |
|---|---|---|
| Auto Exposure | 100% | A 4 |
| Auto Paper Select | | A 4 |

Fig. 6f

| Duplex→One Mode is Selected. | | |
|---|---|---|
| Auto Exposure | 100% | A 4 |
| Auto Paper Select | | A 4 |

Fig. 7

| Functions<br>System | Margin Shift | DPCM | Edge Erase | Move | Trim/Mask | Over-lay | Covers |
|---|---|---|---|---|---|---|---|
| No Option | ○ | ○ | ○ | ○ | ○ | × | × |
| Duplex Unit Installed | ○ | ○ | ○ | ○ | ○ | ○ | × |
| ADF Installed | ○ | ○ | ○ | ○ | ○ | × | ○ |
| Duplex Unit & ADF Installed | ○ | ○ | ○ | ○ | ○ | ○ | ○ |

Fig. 10a

| Select Mode. | |
|---|---|
| Trimming 🗐➡🖹 | Masking 🗐➡🖹 |
| ➡ Enter Cancel | |

Fig. 10b

Input the Area to be trimmed

Area-1  X1=10 X2=0   Y2
        Y1=0  Y2=0   Y1

Input X1 | End | Cancel        X1  X2

Fig. 10c

| Is a 2nd Area Desired? | |
|---|---|
| No  [1] | Yes [1][2] |
| ➡ Enter Cancel | |

| Trimming Mode is Set. | | |
|---|---|---|
| Auto Exposure | 100% | |
| Auto Paper Select | 3 | A 4 |

| Special Mode is Set. | | |
|---|---|---|
| Auto Exposure | 100% | |
| Auto Paper Select | 3 | A 4 |

| Masking Mode is Set. | | |
|---|---|---|
| Auto Exposure | 100% | |
| Auto Paper Select | 3 | A 4 |

Fig. 12a

| Select Front and/or Back Cover. |||
|---|---|---|
| Front only | Front & Back | Back only |
| ⇨ | Enter | Cancel |

Fig. 12b

| Make a Copy on the Front Cover. ||
|---|---|
| No Copy | Copy |
| ⇨ | Enter Cancel |

Fig. 12c

| Cover Placement Mode is Set. |||
|---|---|---|
| Auto Exposure | 100% | A 4 |
| Auto Paper Select | 3 | A 4 |

Fig. 12d

| Special Mode is Set. |||
|---|---|---|
| Auto Exposure | 100% | A 4 |
| Auto Paper Select | 3 | A 4 |

| | Both Side | Covers | Margin | 1 set 2 copies | Edge Erase | Move Cent'g | Trim Mask | Overlay |
|---|---|---|---|---|---|---|---|---|
| Both Side | | X | ○ | ○ (Even) | ○ | ○ | ○ | X |
| Covers | X | | ○ | X | ○ | ○ | ○ | X |
| Margin | ○ | ○ | | ○ (2nd Pg) | ○ | ○ | ○ | ○ |
| 1 set 2 copies | ○ (Even) | X | ○ (2nd Pg) | | ○ | ○ | X | ○ |
| Edge Erase | ○ | ○ | ○ | ○ | | ○ | ○ | ○ |
| Move Cent'g | ○ | ○ | ○ | ○ | ○ | | ○ | ○ |
| Trim Mask | ○ | ○ | ○ | X | ○ | ○ | | ○ |
| Overlay | X | X | ○ | ○ | ○ | ○ | ○ | |

Fig. 16a
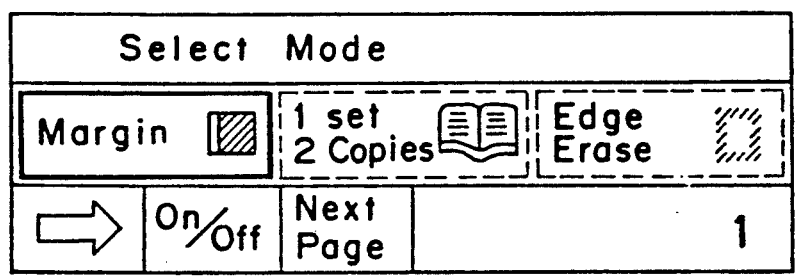
Fig. 16a1
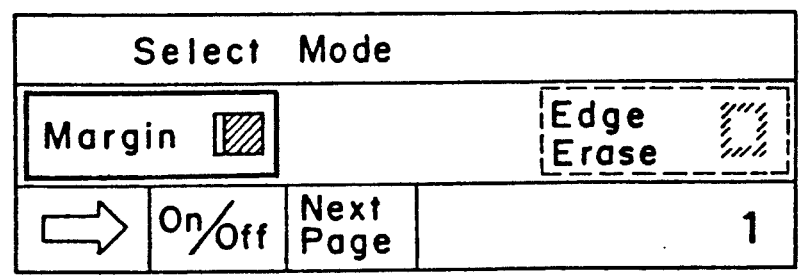

Fig. 17

|    | BS | CV | MG | I2 | EE | MC | TM | OL | SP | PC | ZF | 2F | MS |
|----|----|----|----|----|----|----|----|----|----|----|----|----|----|
| BS | —  | X  | O  | O  | O  | O  | O  | X  | O  | O  | X  | X  | O  |
| CV | X  | —  | O  | X  | O  | O  | O  | X  | O  | O  | O  | O  | O  |
| MG | O  | O  | —  | O  | O  | O  | O  | O  | O  | O  | X  | X  | O  |
| I2 | O  | X  | O  | —  | O  | O  | X  | O  | O  | O  | X  | X  | X  |
| EE | O  | O  | O  | O  | —  | O  | O  | O  | O  | O  | X  | X  | O  |
| MC | O  | O  | O  | O  | O  | —  | O  | O  | O  | O  | X  | X  | O  |
| TM | O  | O  | O  | X  | O  | O  | —  | O  | O  | O  | X  | X  | O  |
| OL | X  | X  | O  | O  | O  | O  | O  | —  | O  | O  | X  | X  | O  |
| SP | O  | O  | O  | O  | O  | O  | O  | O  | —  | X  | O  | O  | O  |
| PC | O  | O  | O  | O  | O  | O  | O  | O  | X  | —  | O  | O  | O  |
| ZF | X  | O  | X  | X  | X  | X  | X  | X  | O  | O  | —  | X  | O  |
| 2F | X  | O  | X  | X  | X  | X  | X  | X  | O  | O  | X  | —  | O  |
| MS | O  | O  | O  | X  | O  | O  | O  | O  | O  | O  | O  | O  | —  |

Fig. 16b
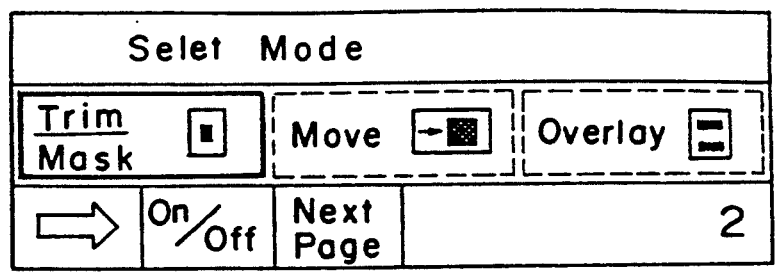
Fig. 16b1
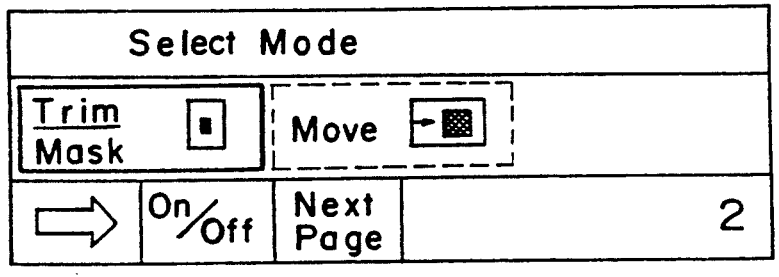
Fig. 16b2
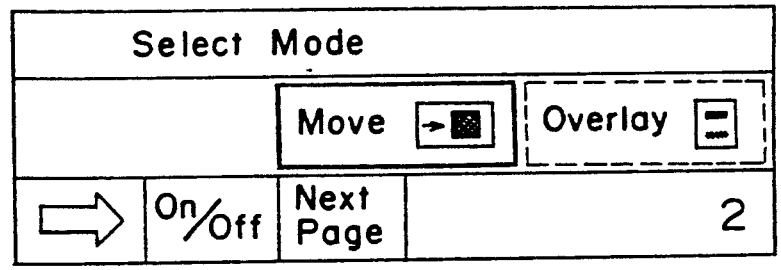
Fig. 16c
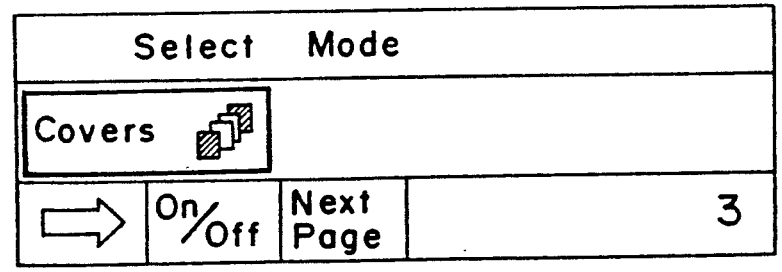
Fig. 16c1
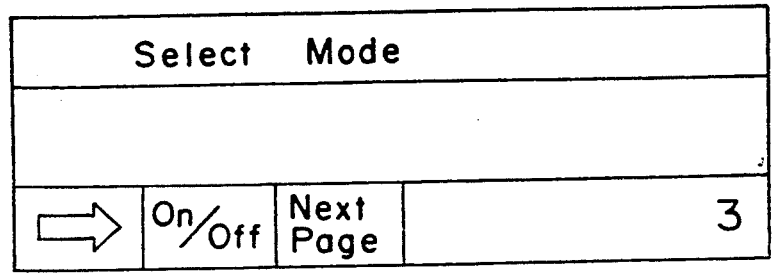

IMAGING APPARATUS FOR DISPLAYING RELATED IMAGING PROCESSING FUNCTIONS

This application is a continuation of application Ser. No. 07/286,868 filed on Dec. 20, 1988, now abandoned.

BACKGROUND OF THE INVENTION

1. Field of the Invention

The present invention relates to an imaging apparatus, such as a copying machine, and specifically to an imaging apparatus of the kind which includes an image processing function which is able to perform such processes as partial deletion and overlay of images.

2. Description of the Related Art

In a conventional imaging apparatus, including such devices as photocopiers, multiple image processing functions, including duplex imaging functions, image overlay functions, and trimming/masking functions, have been provided in response to the demand for multi-functional photocopier operation. When inputting data, for example, the area to be handled by a trimming/masking function, is essential in such image processing functions.

If the keys and switches required for data entry are individually provided for each processing function, the operation panel could become excessively large and operation overly complex. Therefore, display panels including an LCD (liquid crystal display) have been provided in the operation panel of conventional imaging apparatuses, and the selection of which image processing functions to be executed and entry of the data relating to that selection have been accomplished by such a display. Thus, the image processing functions which can be executed in said the photocopier are successively displayed on the display, and the data required for execution of the image processing functions selected by the operator are input immediately after function selection. It is thus possible for the settings of multiple image processing functions to be input by using a single display section, thereby simplifying operation.

In such a conventional imaging apparatus, the image processing functions which could be executed by the apparatus are successively displayed according to the operation of selector switches by the operator. Thus, the operator must operate selector switches until the desired image processing functions are displayed, and this selection process becomes more complex as the number of image processing functions which can be executed increases. Furthermore, when there is no connection to the order in which the image processing functions are displayed, it is difficult for the operator to find the desired image processing function, thus making it extremely difficult to input the settings for the desired image processing functions.

Furthermore, during the selection of the image processing parameters to be executed in such a conventional imaging apparatus, all image processing functions which can be performed by the apparatus were successively displayed whether or not a specific function had been previously set. Thus, image processing parameters which could not be executed in combination with a previously set image processing function are also displayed, and it is possible for the operator to mistakenly select such a function. In this event, when it is determined after entering the data required by the parameters of the current image processing function that the function could not be executed in combination with a previously set function, an error message so notifying the operator would be displayed, which may frustrate the operator and waste data entry time.

Therefore, the object of the present invention is to provide an imaging apparatus which makes it easier to search for the image processing functions desired by the operator by simultaneously displaying from among those multiple image processing functions which can be executed those image processing functions that are interrelated. As a result, the image processing function data entry procedure is simplified.

Another object of the present invention is to provide an imaging apparatus having an image processing function which, by not displaying those image processing parameters which cannot be executed in combination with those previously set image processing parameters during the setting and input of image processing parameters, prevents selection by the operator of such unexecutable functions, does not display a message of nonexecutability after the setting of parameters for an unexecutable function, and thereby avoids operator frustration and wasted data entry time.

SUMMARY OF THE INVENTION

The present invention has been developed with a view to substantially solve the above described disadvantages and has for its essential object to provide an improved imaging apparatus which is able to simplify the image processing function input setting procedure for the operator by an image processing function comprising display means of the kind which simultaneously displays on the display section those functions of multiple image processing functions which are interrelated.

More specifically, the image processing function according to the present invention includes an imaging apparatus provided with an image processing function which accepts from amongst multiple image processing functions the input settings of the image processing functions to be executed by means of a display screen on a display section, in which the imaging apparatus is provided with an image processing function comprising display means of the kind which simultaneously displays on the display section those functions of multiple image processing functions which are interrelated at the time the image processing functions are input and set.

According to the present invention, the functions of multiple image processing functions which are interrelated at the time the image processing functions are input and set, are simultaneously displayed on a display section. Therefore, the operator is able to search for the desired image processing functions in a group of related image processing functions. As a result, inputting the settings for the desired image processing functions is simplified.

BRIEF DESCRIPTION OF THE DRAWINGS

These and other objects and features of the present invention will become apparent from the following description taken in conjunction with preferred embodiments thereof with reference to the accompanying drawings, throughout which like parts ar designated by like reference numerals, and in which:

FIGS. 3a to 3g are flow charts illustrating the processing procedure of the controller of the photocopier;

FIGS. 6a to 6f are plan views illustrating the display panel during setting of the both side copy mode;

FIG. 7 is a chart illustrating the relationship between the optional devices installed to the copier and the functions which can be executed;

FIGS. 10a to 10g are plan views illustrating the display panel during the setting of the trimming/masking function;

FIGS. 12a to 12g are plan views illustrating the display panel during the setting of the cover placement function;

FIGS. 16a to 16c are plan views illustrating the display panel during the operation of the flow chart of FIGS. 15a and 15b; and FIG. 17 is a chart similar to the chart illustrated in FIG. 13, but illustrating an extended version.

DETAILED DESCRIPTION OF THE PREFERRED EMBODIMENTS

The preferred embodiment of the present invention as hereinafter described uses a photocopier in one example as an imaging apparatus which has various image processing functions which can be selected according to the present invention.

Figure 2:
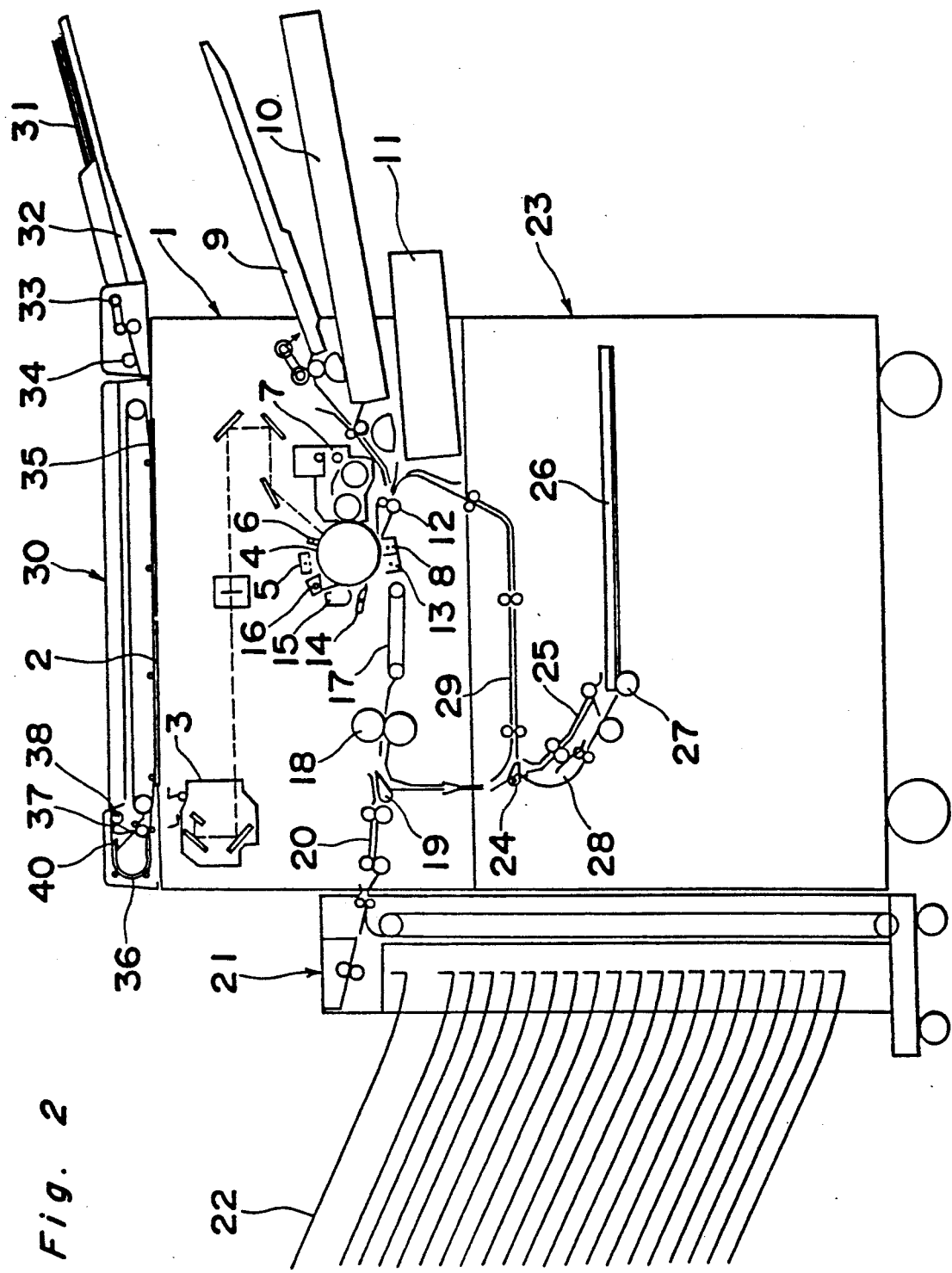
FIG. 2 is a front cross sectional diagrammatic view of the photocopier of FIG. 1.

Referring to FIG. 2, a cross sectional view of a photocopier according to a preferred embodiment of the present invention is illustrated.

On the top of copier 1 is an original table 2 made of a transparent hard glass body. The image of the original placed on top of original table 2 is scanned by optical unit 3. At the center inside of the copier 1, a photoconductive drum 4 is provided in such a manner as to rotate freely. Formed around the photoconductive drum 4 is a copying process section which includes an electrostatic charger 5, a blank lamp 6, a developer unit 7, a transfer charger 8, a separation charger 13, a separation claw 14, a cleaning unit 15, and a cleaning lamp 16.

Formed at one side of copier 1 is a paper feed section to which are installed a manual feed tray 9, and paper cassettes 10 and 11. Paper is fed from this paper feed section to a registration roller 12. At the other side of the copier 1 is provided an ejection path 20, on the exterior of which is attached a sorter 21. The sorter 21 stores the paper ejected by way of the ejection path 20 in bins 22. Between the copying process section and the ejection path 20 is the transport section including a transport belt 17, a fusing roller 18, and other components. Provided in this transport section is a flapper 19. The flapper 19 conducts the paper which has completed the copying process to the ejection path 20 or to sub-transport paths 28 and 29.

The copier 1 is mounted on a cabinet 23, inside of which are provided the switchback sub-transport path 28 which extends from part of the transport path to an intermediate tray 26, and the sub-transport path 29 which similarly extends from part of the transport path to just before the registration roller 12. At the junction of the switchback sub-transport path 28 and the sub-transport path 29 is provided a flapper 24, which selectively guides the paper conducted from the transport path toward cabinet 23 to either the switchback sub-transport path 28 or the sub-transport path 29.

The paper conducted to the intermediate tray 26 is conducted through the switchback sub-transport path 28 an the sub-transport path 29 to the registration roller 12. Thus, when the paper on one side, which has the copied image formed thereon, is conducted from the transport path through a subtransport path 25 to the intermediate tray 26, and hence through the switchback sub-transport path 28 and the sub-transport path 29 to the registration roller 12 and from the registration roller 12 to the copying process section, the other side of the paper, specifically the side on which an image is not formed, is in opposition to the photoconductive drum 4, in order to enable a duplex copying mode. Moreover, when the paper which has completed the copy process is once again conducted to the copying process section directly from the transport path through the sub-transport path 29 and then from the registration roller 12, the side on which the image had been formed once again faces the photoconductive drum 4 in order to enable an image overlay copying mode operation.

A reversible automatic document feeder (hereafter RADF) 30 is mounted on top of the copier 1. This RADF 30 has a transport belt 35 which rotates in contact with the top of the original table 2, and feeds an original 31 conducted from an original tray 32 by the rotation of paper feed rollers 33 and 34 to the specified position on the original table 2. Furthermore, the RADF 30 also has an original looper section 36 which reverses and conducts, through a transport path 37, duplex originals for which the copying process has been completed for a single side, once again to the specified position on the original table 2. Normal single-side originals are ejected to the outside by an ejection roller 38 after the copying process is completed. A flapper 40 provided in the original looper section 36 selectively conducts the original conducted by the transport belt 35 to either the transport path 37 or the ejection roller 38.

Figure 1:
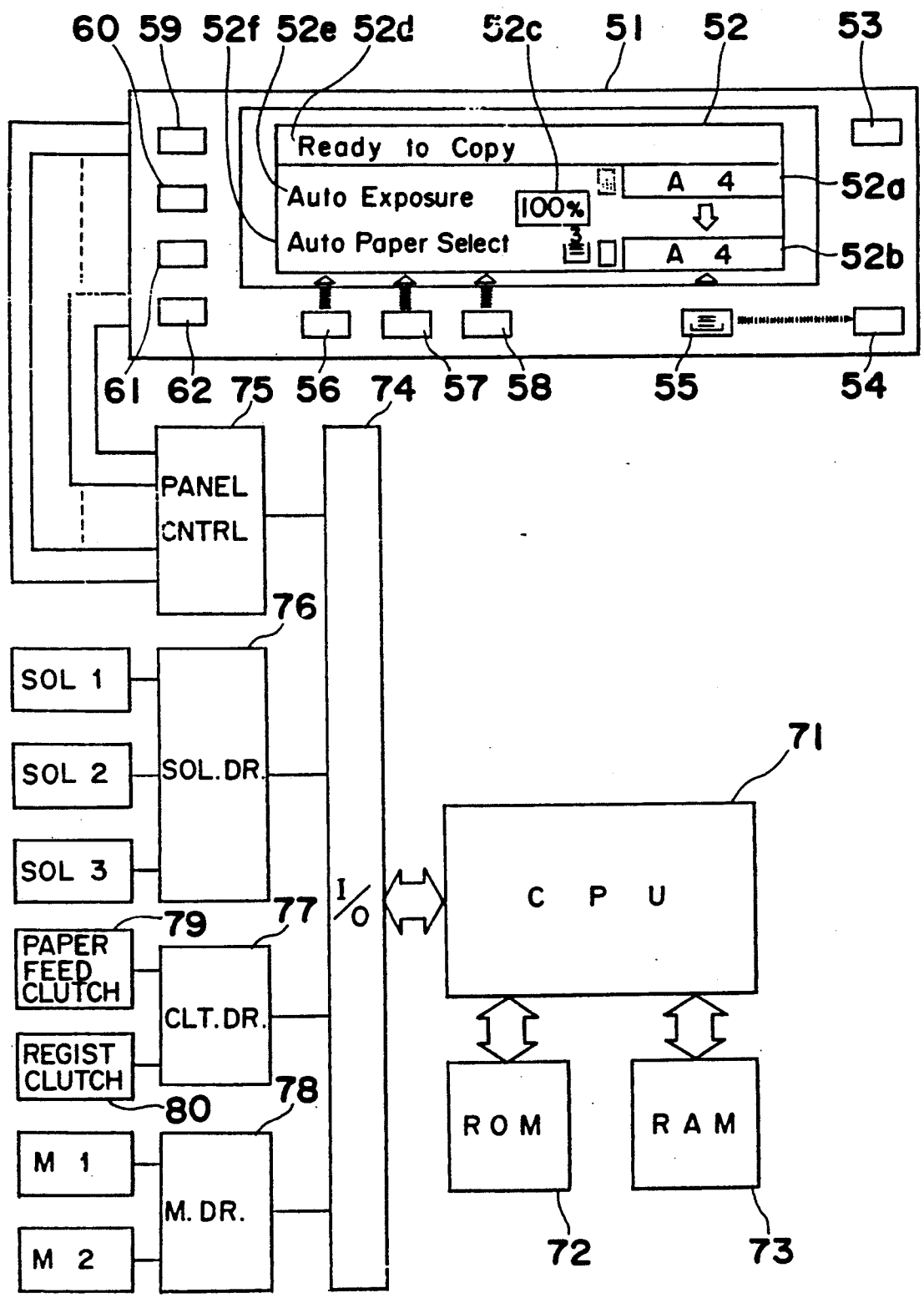
FIG. 1 is a block diagram of a photocopier according to a preferred embodiment of the present invention.

Referring to FIG. 1, a block diagram of the controller, including part of the operation panel, in the aforementioned photocopier is illustrated.

A display panel 52 is provided in part of an operation panel 51. This display panel 52 is formed by an LCD. The display condition of the display panel 52 in the initialized state is illustrated in FIG. 1. The display includes an original size indicator 52a, a copy paper size indicator 52b, a copy ratio indicator 52c, a message display 52d, an automatic copy density adjustment mode indicator 52e, and an automatic paper/copy ratio selection mode indicator 52f. At the left side of the display panel 52 is a copy ratio set key 59, a density selector key 60, a duplex mode selector key 61, and a special function mode key 62. Furthermore, at the bottom of the display panel 52 are provided an automatic copy ratio selector key 54, a paper cassette selector key 55, and level adjustment keys 56, 57 and 58. In addition, at the right side of the display panel 52 is provided a confirm key 53 for effecting the display to illustrate the selected functions.

The operation panel 51 defined as hereabove is controlled by a CPU 71 via a panel controller 75. Besides the panel controller 75, the CPU 71 is also connected through an I/O interface 74 to a solenoid driver 76, a clutch driver 77, and a motor driver 78. ROM A 72 connected to the CPU 71 is written with a program defining the operation of the CPU 71, and input/output data is temporarily stored in the specified memory area of a RAM 73. CPU the 71 outputs control data to the solenoid driver 76, the clutch driver 77, and the motor driver 78 according to the ON/OFF condition of the keys as input from the panel controller 75. The solenoid driver 76 drives solenoids SOL1, SOL2 and SOL3 according to this control data, and similarly, the clutch driver 77 drives a paper feed clutch 79 and a registration clutch 80. Furthermore, the motor driver 78 likewise drives a main motor M1 and an optical mechanism drive motor M2.

Next, the operation of the copier is described in different situations in connection with FIGS. 3a–14.

(1) Initialization operation

Figures 13, 14:
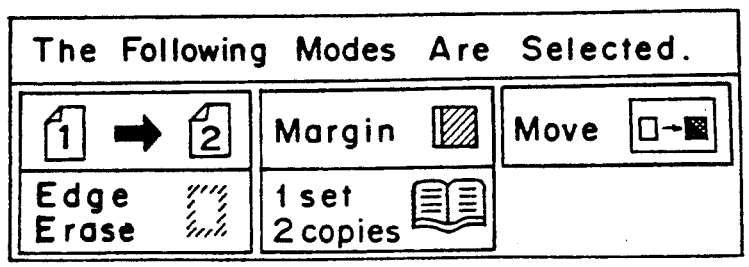
FIG. 13 is a chart illustrating the relationship between image processing functions and simultaneously executable image processing functions.
FIG. 14 is a plan view illustrating the display panel during operation of the confirm key.

The warming up procedure, including which includes increasing the temperature of the fusing roller 18, is executed when the power to the copier 1 is turned on. Furthermore, PLEASE WAIT is displayed in the message display 52d of the display panel 52 at this time. When the warming up procedure is completed, the color of the indicator of the print switch (not shown) changes, and the message READY TO COPY is displayed in the message display 52d as illustrated in FIG. 1. During this standby state, the CPU 71 awaits operation of the key switches on the operation panel 51 (step n1 in FIG. 3a). If the confirm key 53 is operated during this standby mode, the functions set in the special function mode (which will be described later under item (6)) are displayed as illustrated in FIG. 14 until timer T increments to the rated time (steps n6–n9). If there are no function settings at this time, NO FUNCTION SETTINGS is displayed in the message display 52d.

(2) Basic copying operation

If the print switch is pressed while the copier 1 is in the standby mode (step n10), the main motor M1 is driven (step n11), and the paper feed clutch 79 is turned ON (step n12). Thus, the paper is fed from the paper feed section toward the registration roller 12. At the predetermined timing, the optical mechanism drive motor M2 is driven to feed the mirror, and the optical unit 3 begins to scan the original image on the original table 2. In addition, at the specified timing, the registration clutch 80 is turned ON, and the paper is conducted to the copying process section. On the surface of the photoconductive drum 4 in the copying process section, an electrostatic latent image is formed by the illumination of the light reflected from the light of the optical unit 3 on the original, and this electrostatic latent image is developed by the developer unit 7. The developer image thus formed on the surface of the photoconductive drum 4 is transferred to the surface of the paper.

When the optical unit 3 reaches the end of the paper, the optical mechanism drive motor M2 is driven to return the mirror (steps n15 and n16). Thus, the optical unit 3 travels in the reverse direction, and is reset to the stop position. Furthermore, the paper is conducted from the copying process section by the transport belt 17 past the fusing roller 18 and to the sorter 21 from the ejection path 20. When ejection of the paper is thus completed (step n17), the contents of the counter S arranged at a specific address in the RAM 73 decrement (step n18), and the process of steps n11 to n18 are repeated until the content of the counter S becomes 0 (from step n19 to step n11). This counter S holds the number of copies to be made as inputted by operating a keypad (not shown), and is set when the copy number is input. Each time the copy is made, the counter S counts down. Therefore, by repeating procedures n11 to n18 until the content of counter S becomes 0, the copying process ca be performed continuously for the number of copies entered by the operator.

(3) Copy density adjustment mode

Figure 3A:
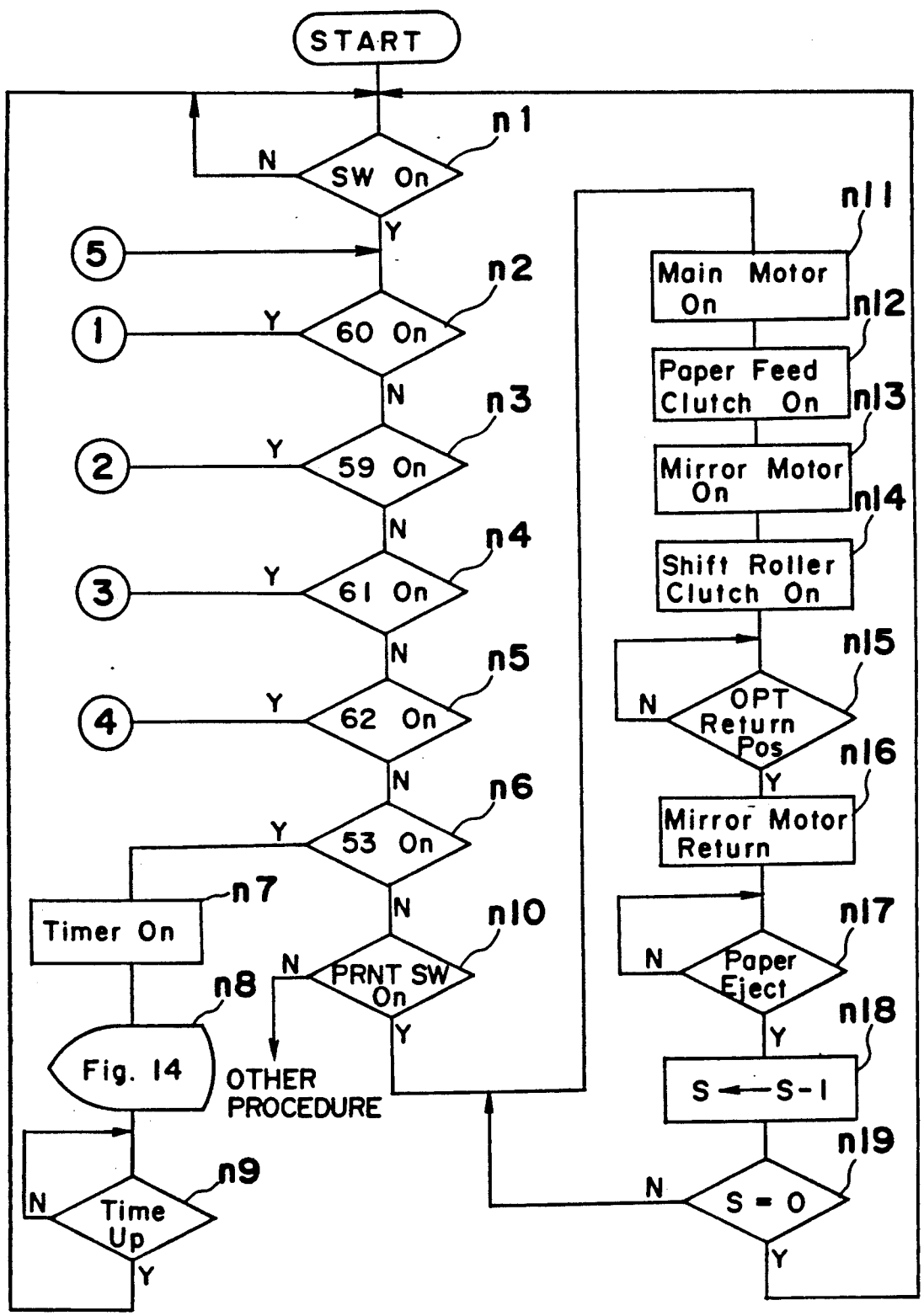
Figure 3B:
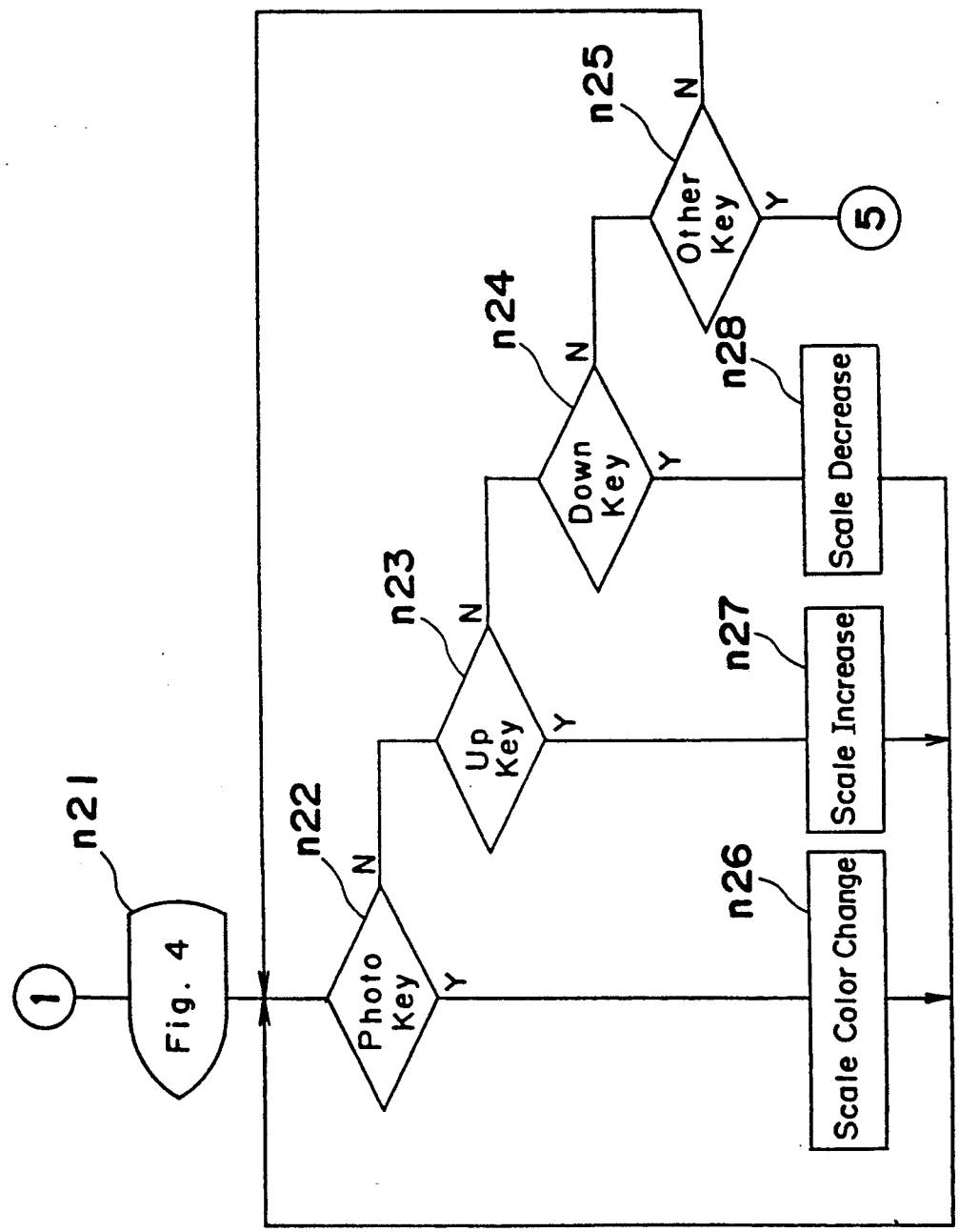
Figure 3C:
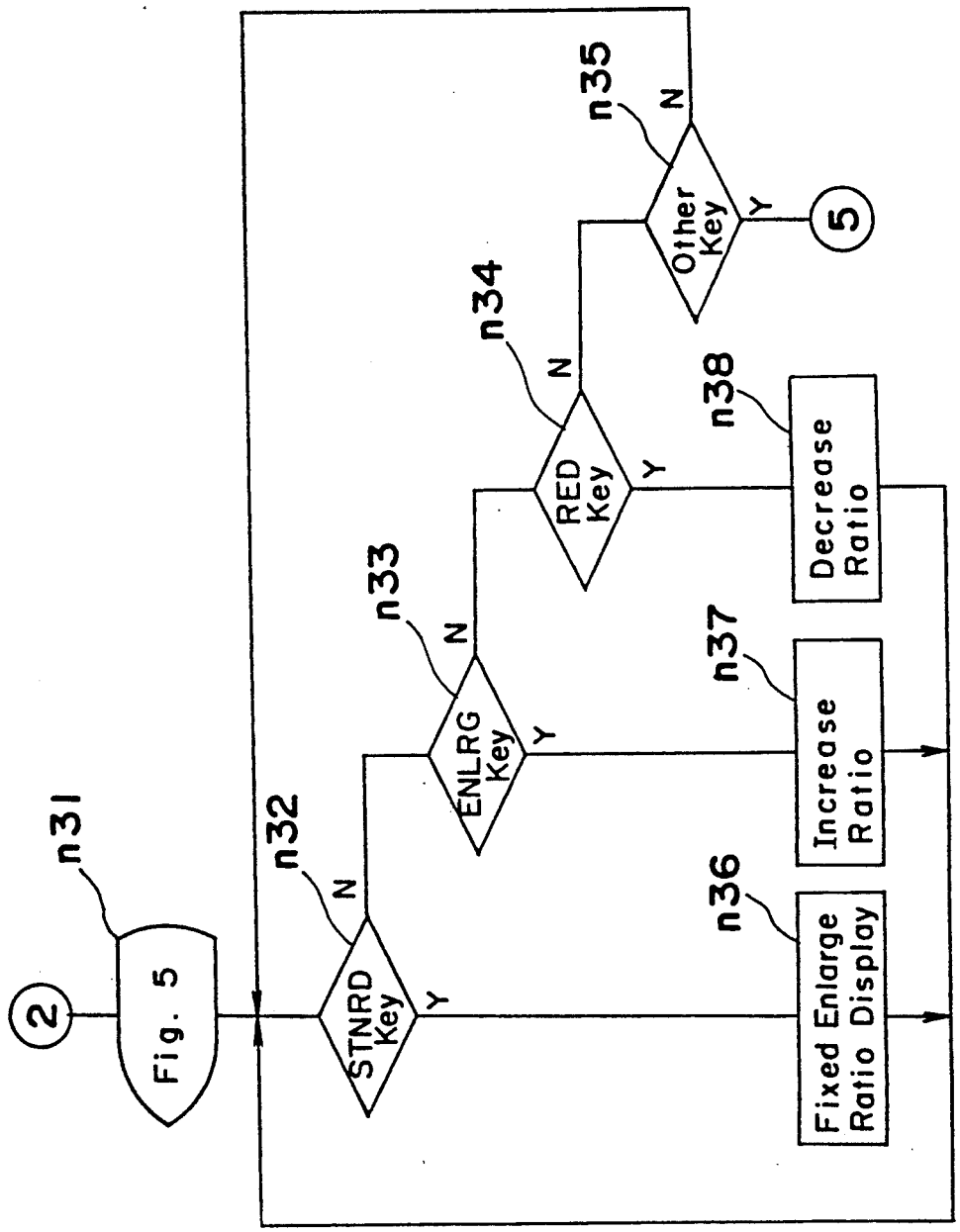
Figure 3E:
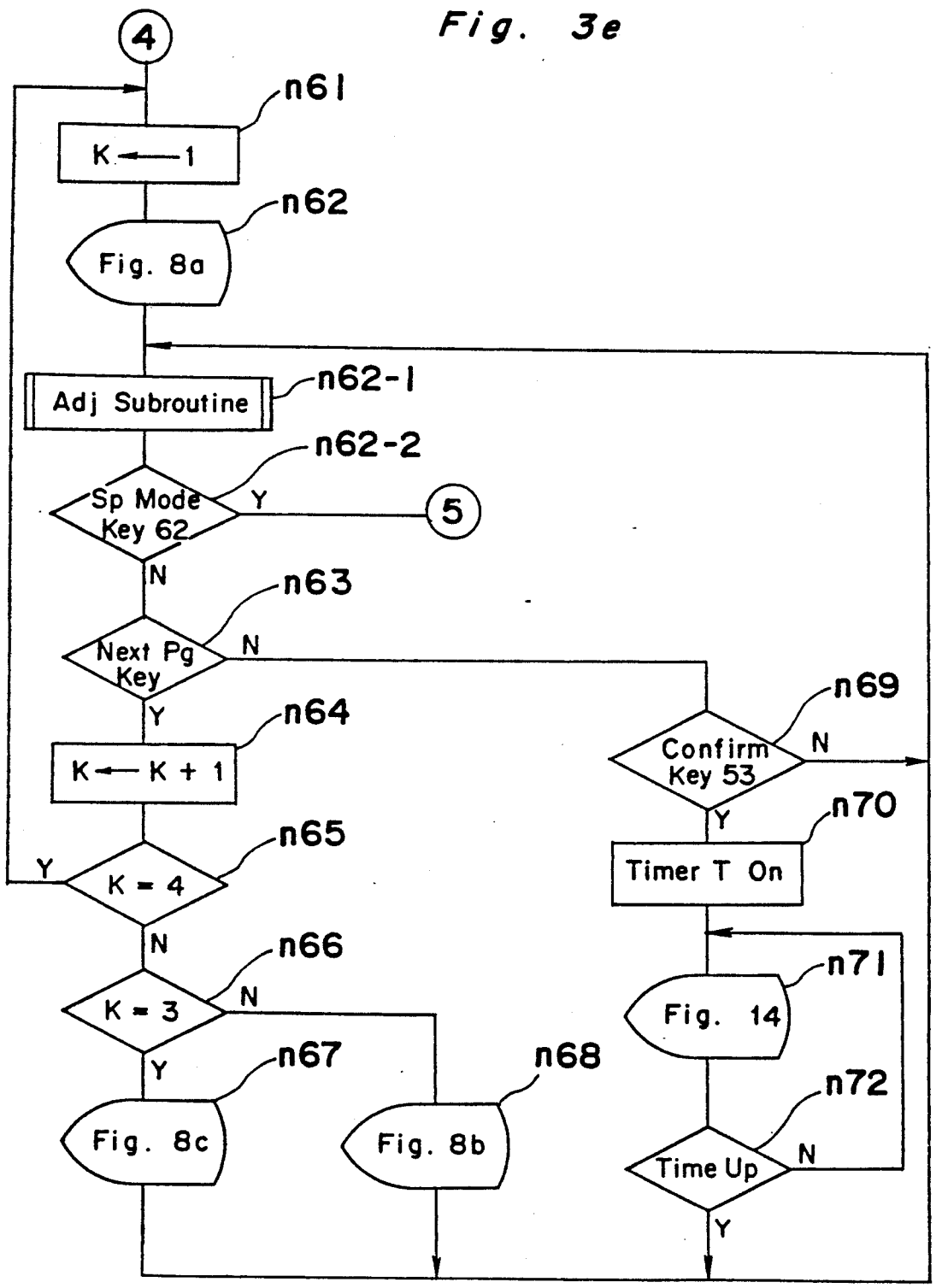
Figures 1, 3F:
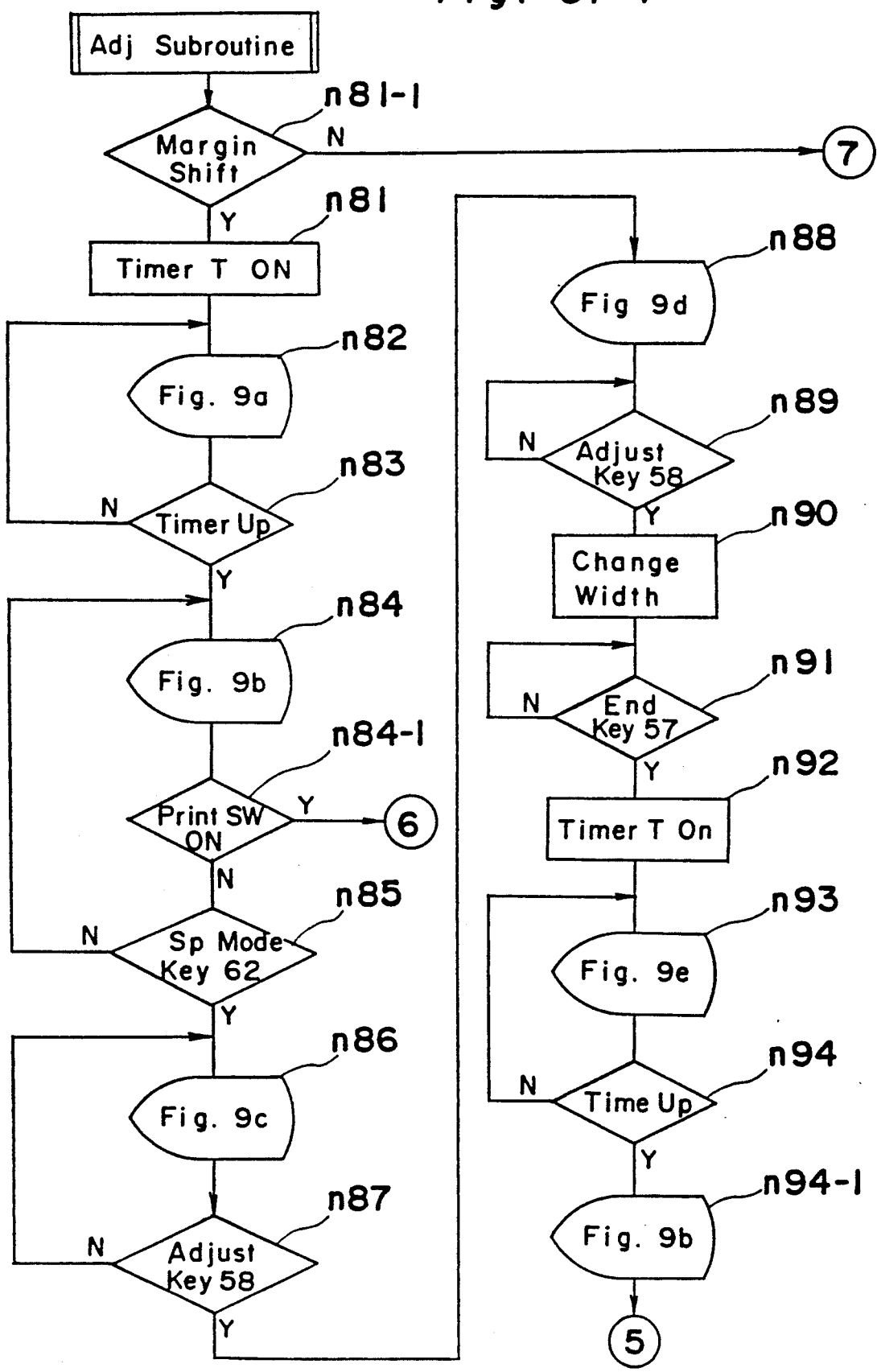
Figures 2, 3F:
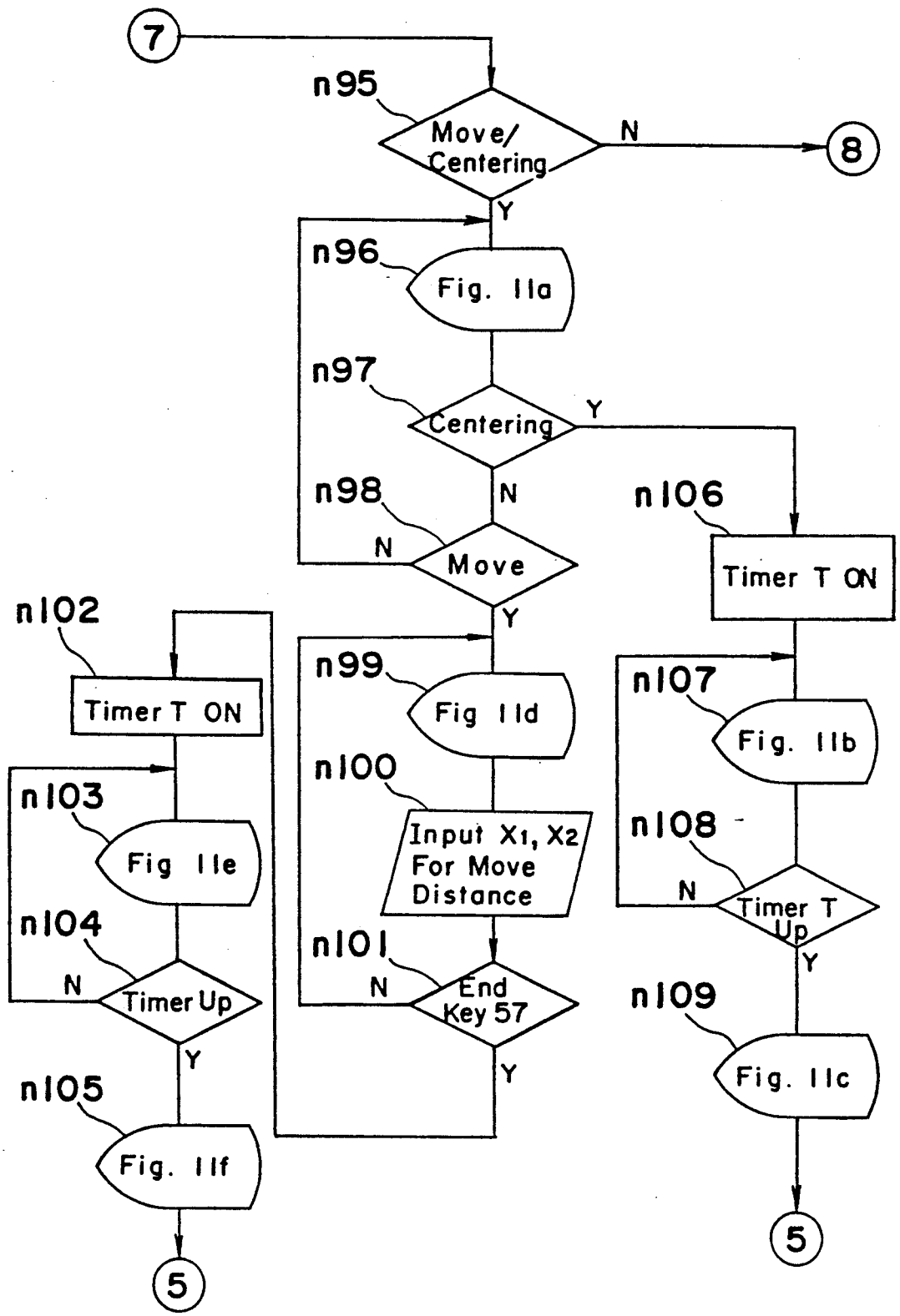
Figures 3, 3F:
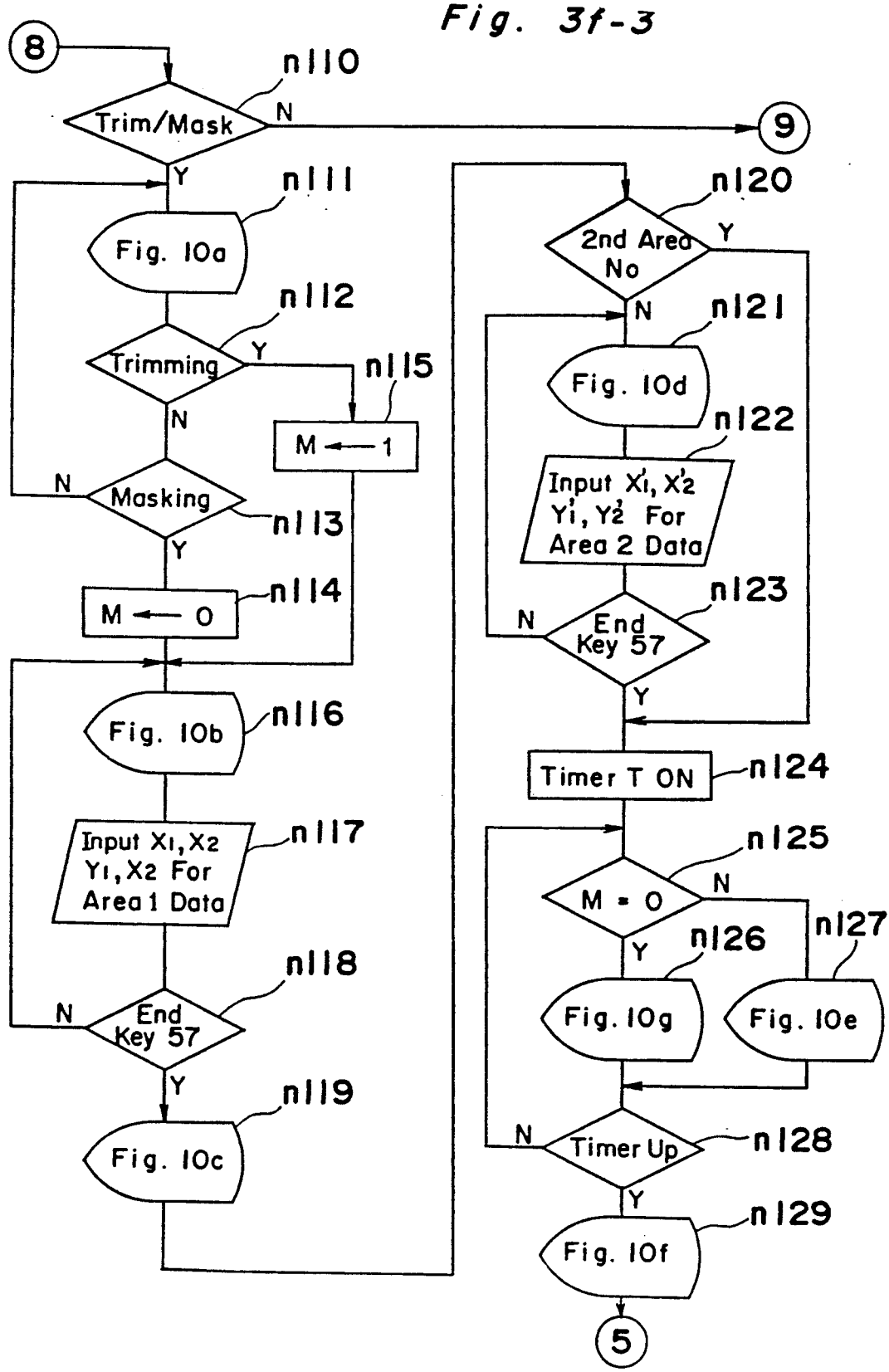
Figures 3, 3F, 4:
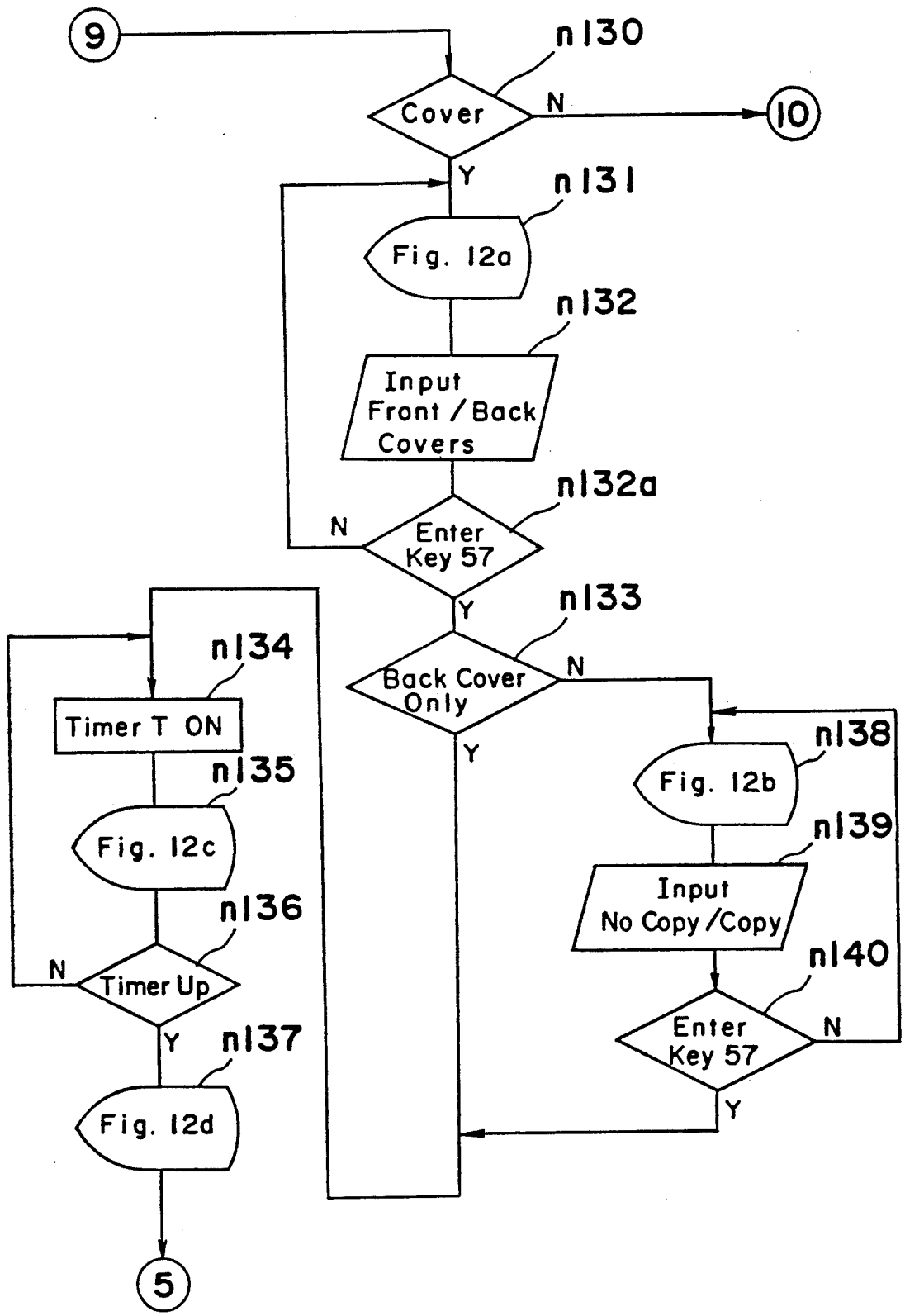

When a density selector key 60 is operated in the standby mode (step n2), the display panel 52 assumes the condition illustrated in FIG. 4. As illustrated in FIG. 4, a density scale 64 is displayed in the center the of display panel 52, and density level guides 63 are displayed at the positions corresponding to level adjustment keys 56, 57 and 58. Thereby, input of level adjustment keys 56, 57 and 58 awaits in this state. If the level adjustment key 57 is operated to select the half-tone mode, the density scale 64 changes color to indicate that an image quality setting appropriate for half-tone originals, such as photographs, has been selected (steps n22 and n26). If the increased level adjustment key 58 is operated, the value of the density scale 64 increases (steps n23 and n27), and if the decreased level adjustment key 56 is operated, the value of the density scale 64 decreases (steps n24 and n28). If the operated key is another key, the procedure returns to step n2 (step n25). Thus, when the density selector key 60 is operated, the display panel 52 is set to a manual mode adjustment state, and operator-controlled mode settings are accepted.

(4) Copy ratio set mode

Figures 3, 3F, 4, 5:
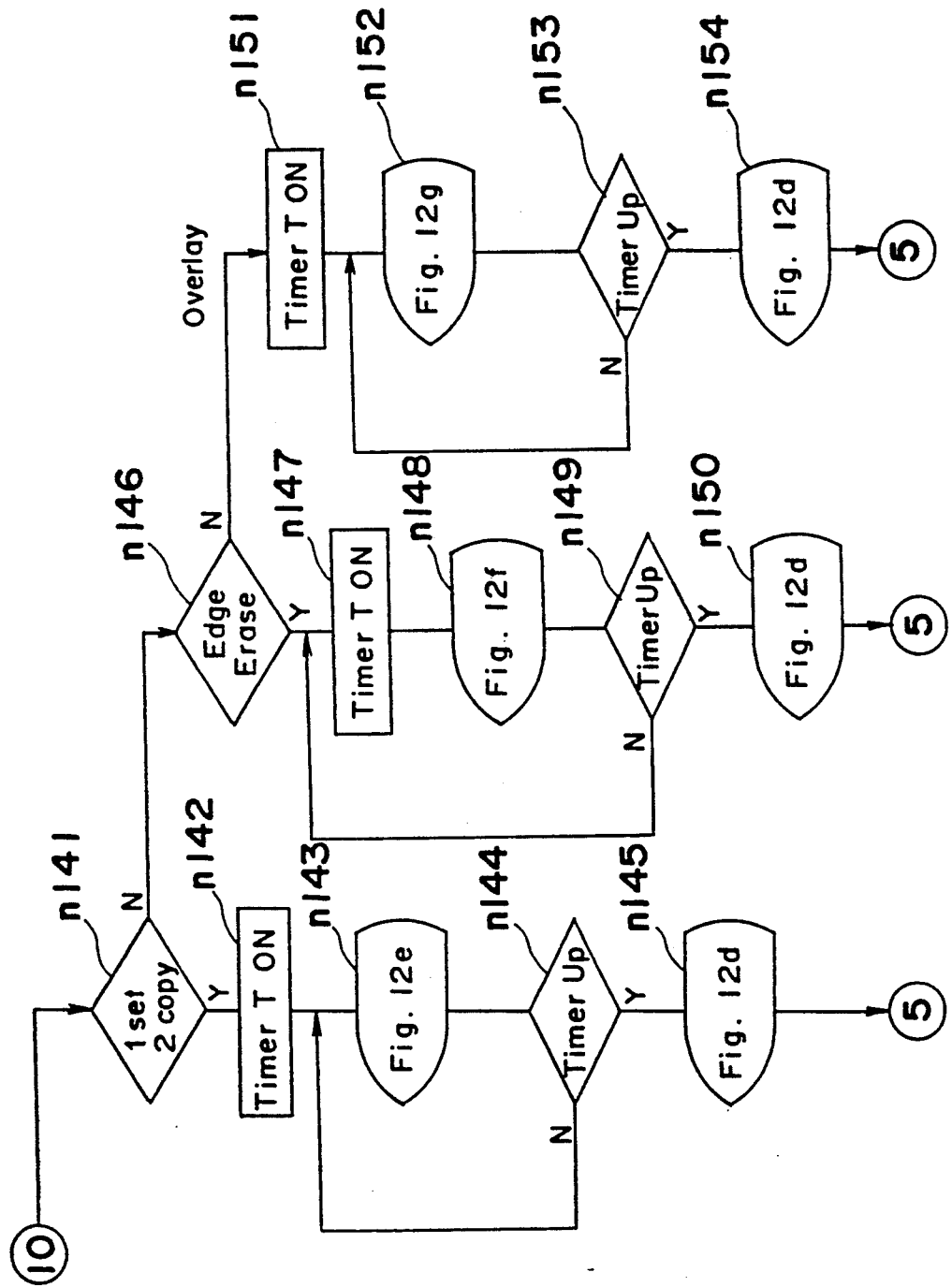

If the operated key in the standby mode is the copy ratio set key 59 (step n3), the display panel 52 assumes the condition illustrated in FIG. 5 (step n31). When the copy ratio set key 59 is operated, a copy ratio scale 66 is displayed at the center of the display panel 52, and an adjustment level 65 is displayed at the positions corresponding to the level adjustment keys 56, 57 and 58. If the level adjustment key 57 for standard copying modes is operated in this state, the fixed enlargement copy ratios, for example, A4 to B4, or reduction ratios, for example, A4 to B5, are successively displayed (steps n32 and n36). Furthermore, if the increased level adjustment key 58 is operated, the copy ratio increases (steps n33 and n37), and if the decreased level adjustment key 56 is operated, the copy ratio decreases (steps n34 and n38). The copy ratio varied by operating the level adjustment keys 56, 57 and 58 is displayed in the copy ratio scale 66 and the copy ratio indicator 52c. Thus, when the copy ratio set key 59 is operated, the display panel 52 is set to the state as illustrated in FIG. 5, and the copy ratio set by the operator is accepted.

(5) Both side copy mode

If the operated key in the standby mode is the duplex mode selector key 61, a check is performed to determine whether the cabinet 23 illustrated in FIG. 2 and comprising the duplex unit is installed (jumps from step n4 to step n41 in FIG. 3d). If the duplex unit is not installed, a check is performed to determine whether the RADF 30 is installed (step n42). If neither the duplex unit nor the RADF 30 are installed, the display panel 52 displays the message in FIG. 6a for the time counted by timer T, and then returns to the standby mode (steps n43, n44, n45 and n2). This timer T is arranged in the RAM 73 at a particular address area, and counts a time of approximately 3 to 5 seconds. If only the RADF 30 is installed, the display panel 52 displays the message illustrated in FIG. 6f (step n52), and the mode for copying the image of a duplex original to only one side of the paper is set (step n53). Thus, the images on both the front and back of the duplex original 31 set on the original tray 32 are each copied to single sides of separate sheets of paper.

If the duplex unit is installed, the presence of the RADF 30 is detected (step n46). If the RADF 30 is not installed, it is checked whether an automatic document feeder (hereafter ADF) not shown in the figure is installed (step n47). This ADF feeds the original in one direction from the original feed position, past the original table 2, and directly to the original eject position. It can not invert and refeed the original to the original table 2 as in the RADF 30. If such an ADF is not installed, the display panel 52 displays the message illustrated in FIG. 6d, and copies the images on the original set by the operator on the original table 2 to both the front and back of the paper. In this case, the copy process is executed when the print switch is operated by the operator. Specifically, if the print switch is operated after the operator sets the original on the original table 2, paper is fed from the paper feed section. This paper is conducted to the intermediate tray 26 after the copying process is completed. When the operator replaces the original and again presses the print switch, the paper is conducted from the intermediate tray 26 through the sub-transport path 29 and to the copying process section, and the images of two originals are thus copied to the front and back of a single sheet of paper.

If the duplex unit and the ADF are installed, the display panel 52 displays the message illustrated in FIG. 6c, and awaits an operator input specifying whether the original has an even or odd number of pages (steps n49 and n50). If the duplex unit and the ADF are installed, images from single side originals are automatically and continuously copied to both sides of the copy paper. In this case, if the number of single-side originals is even, copies are conducted to the intermediate tray 26 from the first sheet of copy paper. If the number of single-side originals is odd, the copy paper for copying the image of the first original is ejected as a single-side copy, and copies are conducted to the intermediate tray 26 from the second copy paper. Thus, the images of two single-side originals are copied to both sides of the copy paper according to the copy number data input by the operator.

If both the duplex unit and the RADF 30 are installed as illustrated in FIG. 2, the display panel 52 displays the message illustrated FIG. 6b (step n54), and selection by the operator of the copy mode for copying single-side originals to both sides of the copy paper, the mode for copying images from duplex originals to both sides of the copy paper, or the mode for copying images from duplex originals to single sides of separate sheets of copy paper is awaited. At this time the mode is selected by the operating level adjustment key 56, and the selection is entered by the operating level adjustment key 57. If the mode for copying single-side originals to both sides of the copy paper is selected, the contents of FIG. 6c are displayed (steps n55 and n49), and if the mode for copying images from duplex originals to single sides of separate sheets of copy paper is selected, the contents of FIG. 6f are displayed (steps n59 and n52). Furthermore, if the mode for copying images from duplex originals to both sides of the copy paper is selected, the display panel 52 displays the message illustrated in FIG. 6e (step n57), and the mode for copying images from duplex originals to both sides of the copy paper is set.

If the duplex mode selector key 61 is thus operated, a check for other devices connected to the copier is performed, and the display panel 52 displays messages appropriate to the copier condition. Thus, the operator is able to execute duplex copying using the mode appropriate to the copier condition.

(6) Special function mode (i) Special functions of the Copier

The following special functions are available for the copier 1 according to the present embodiment.

a) Margin shift

The margin shift is a function which automatically leaves a larger margin on the left side of the copy and a smaller margin on the right so that the left side of the copy can be easily stapled or bound. The detail of the margin shift mode is disclosed, for example, in U.S. Pat. No. 4,451,136 issued May 29, 1984 or in U.S. Pat. 4,350,439 issued Sep. 21, 1982.

b) Book copy (1 set 2 copies)

The book copy is a function for automatically making a copy of a page individually of an opened book placing two pages on the glass table 2. The detail of the book copy (1 set, 2 copies) is disclosed, for example, in U.S. Pat. No. 4,017,173 issued Apr. 12, 1977.

c) Edge erase

The edge erase is a function which makes the peripheral of the copy paper always clear in spite of any original image so as to avoid undesirable shadings at the peripheral of the copy paper. The detail of the edge erase is disclosed, for example, in Japanese Patent Laid-open Publication (not examined) No. 60-49360 issued Mar. 18, 1985.

d) Trimming/masking

The trimming is a function used for deleting the original image on all areas of a copy paper other than a specified area. In other words, the image appears only in the specified area. Two rectangular areas can be specified. The masking is a function used for deleting the original image at a specified area. Two rectangular areas can be deleted. The detail of the trimming/masking function is disclosed, for example, in Japanese Patent Laid-open Publication (not examined) No. 61-228472 issued Oct. 11, 1986.

e) Move

The move is a function used to move the entire original or a portion of an original to the right or left on the copy paper. The distance to be moved must be specified as desired. The detail of the move function is disclosed, for example, in Japanese Patent Laid-open Publication (not examined) 56-83756 issued Jul. 8, 1981.

f) Centering

The centering is a function used to move the entire or a portion of an original to the center of the copy paper. The detail of the centering function is disclosed, for example, in U.S. Pat. No. 4,714,941 issued Dec. 22, 1987.

g) Overlay

The overlay is a function used to make a copy having a portion selected from a first original and another portion selected from a second original. The detail of the overlay function is disclosed, for example, in U.S. Pat.

No. 3,960,445 issued Jun. 1, 1976, or in U.S. Pat. No. 4,627,707 issued Dec. 9, 1986.

h) Cover page placement

The cover page placement is a function used to add a front and/or back cover of the copied document. The detail of the covering is disclosed, for example, in Japanese Patent Laid-open Publication (not examined) No. 60-191932 issued Sep. 30, 1985 or in Japanese Patent Laid-open Publication (not examined) No. 62-185676 issued Aug. 14, 1987.

(ii) Setting

If the special function mode key 62 is operated in the standby mode, the procedure illustrated in FIG. 3e is executed, enabling selection of the image processing functions included within the special functions. As illustrated in FIG. 7, the image processing functions which can be selected at this time vary according to the optional devices installed on the copier 1. Furthermore, as illustrated in FIG. 13, some functions can or cannot, in principle, be used simultaneously due to the basic specifications of the copier. When the special function mode key 62 is operated, the contents of a counter K are first set to 1 (step n61). This counter K is arranged in a specific address in the RAM 73, and counts the number of operations of the level adjustment key 58 corresponding to the next page key described hereinafter. Next, the display panel 52 displays the message illustrated in FIG. 8a (step n62). Thereafter, an adjustment subroutine (step n62-1) is carried out, the details of which will be described later in connection with FIGS. 3f-1 to 3f-5.

It is subsequently checked whether or not the special mode key 62 is on or not (step n62-2). If the key 62 is on, the procedure returns to step n2, and if the key 62 is not on, the procedure goes to step n63. If the level adjustment key 58 corresponding to the next page key is operated at this time (step n63), the counter K is incremented (step n64), and the content of the counter K is immediately checked (steps n65 and n66). If the content of the counter K is 3, display the panel 52 displays the message illustrated in FIG. 8c (step n67). If the content of the counter K is 2, the display panel 52 displays the message illustrated in FIG. 8b (step n68). If the content of the counter K is 4, the procedure returns to step n61 (steps n65 and n61). In the above process, steps n62, n67, and n68 are provided to display data informative to the operator such that the functions which the operator will select one after the other in frequent cases (such functions are called related special functions) are displayed simultaneously, making it easy for the operator to select the related functions.

If the confirm key 53 is operated (step n69), the display panel 52 displays the contents of FIG. 14 for the time specified by a timer T (steps n70 to n72). This makes it easier for the operator to confirm the currently selected functions and other information, such as the current density and copy ratio settings. Furthermore, if the copy density is set by manual the density adjustment at this time, density scale 64 illustrated in FIG. 4 is displayed in automatic copy density adjustment mode indicator 52e. Likewise, during manual paper selection and manual copy ratio selection, the copy ratio scale 66 illustrated in FIG. 5 is displayed in automatic paper-/copy ratio selection mode indicator 52f.

Figure 8A:
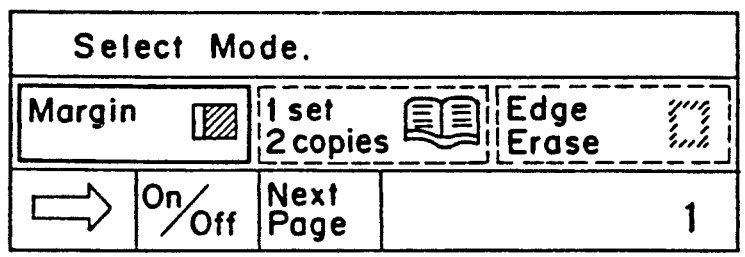
FIGS. 8a to 8h are plan views showing the display panel during the setting of the margin shift function and cover page placement function.
Figure 8B:
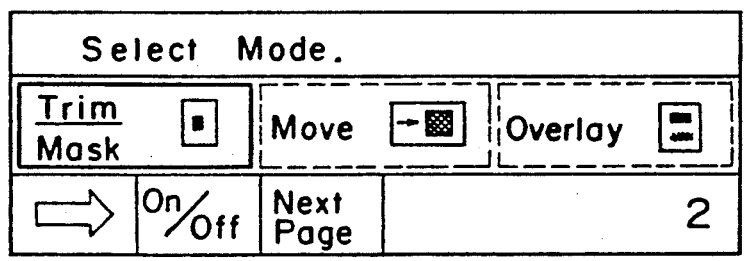
Figure 8C:
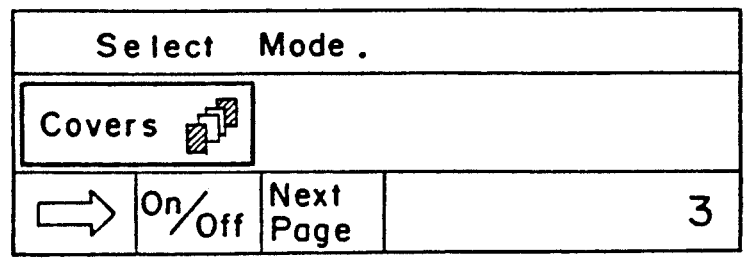
Figure 8D:
Figure 8E:
Figure 8F:
Figure 8G:
Figure 8H:

Thus, if the special function mode key 62 is operated, the contents of either FIG. 8a, 8b or 8c are displayed on the display panel 52. Each time the operator operates the increased level adjustment key 58, the contents illustrated in FIG. 8a, FIG. 8b, and FIG. 8c are displayed, respectively, at steps n62, n68, and n67 in the display panel 52. When the contents of FIG. 8a, 8b or 8c are displayed on the display panel 52, the operator is able to input the selection of the desired related special functions easily and quickly using the level adjustment keys 56 and 57. All of the functions illustrated in FIG. 8a relate to functions executed when copying a bound original, such as a book. These related special functions are called book copying functions. The functions illustrated in FIG. 8b relate to functions requiring input of the copy area, thus they are called area copying functions. Because functions relating to a group of common functions are thus displayed for each function, the operator can more easily select the function to be executed.

If a plurality of special functions are to be set simultaneously, the display changes according to the functions that has been already selected. Specifically, as illustrated in FIG. 13, in the both side copy mode it is not possible to simultaneously set the cover page placement function mode or the overlay function mode. If the cover page placement function mode is set, the both side copy mode, the book copy (1 set 2 copies) function mode and the overlay function mode cannot be set. Moreover, if the book copy (1 set, 2 copies) function mode is set, the cover page placement function mode and the trimming/masking function mode cannot also be set. This is unavoidable due to the functions of the copier 1 and the installed devices. Therefore, previously set modes and functions are stored at a specific address in the RAM 73, and if a function which cannot be simultaneously executed with another function which has already been set is selected, or if functions which cannot be executed due to the relationships illustrated in FIG. 7 are selected, the messages illustrated in FIGS. 8a, 8b and 8c are displayed in message display 52d, indicating that the setting is not possible.

FIGS. 8d, 8e, 8f and 8g illustrate copiers installed with further special functions which are related to the cover page placement function. Such special functions are:

a) Stapling

Stapling is a function for stapling one side of the document, and is disclosed in detail, for example, in U.S. Pat. No. 4,281,920.

b) Punching

Punching is a function for making perforations along one side of the document for the binding purpose. The detail of the punching is disclosed, for example, in Japanese Utility Model Laid-open Publication 57-162649 (not examined);

c) Z fold/two fold

Z fold is a function for folding the copied paper in three sections in a manner of Z cross-section. Two fold is a function for folding the copied paper in two sections. The detail of the Z fold/two fold is disclosed, for example, in British Patent Publication GB-A1-2,187,174 issued Sep. 3, 1987.

d) Mark/stamp

Mark/stamp is a function for providing a written mark, such as a title of the document by, e.g., a word processing printer provided in association with the copier or for providing a stamp, such as a "SECRET" by, e.g., a suitable stamping apparatus provided in association with the copier. The detail of the mark/stamp is disclosed, for example, in Japanese Patent Laid-open Publication (not examined) No. 61-53665 issued Mar. 17, 1986.

(iii) Margin shift mode

The margin shift mode is selected such that, during the condition when the display 52 display the message of FIG. 8a in which the margin shift mode is indicated by a bold line, an On/Off switch is turned on by the actuation of the key 57. If the edge erase mode is requested from the condition illustrated in FIG. 8a, an arrow switch is activated twice by the actuating key 56 so that the edge erase mode is now indicated by a bold line. Then, the On/Off switch is turned on by the actuation of the key 57. In this manner, one of the related functions shown in the mid row of the display 52 can be selected for the operation.

Figure 9A:
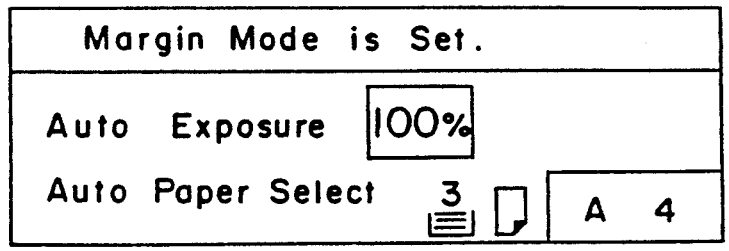
FIGS. 9a to 9e are plan views illustrating the display panel during the adjustment of the margin shift amount during margin shift function setting.
Figure 9B:
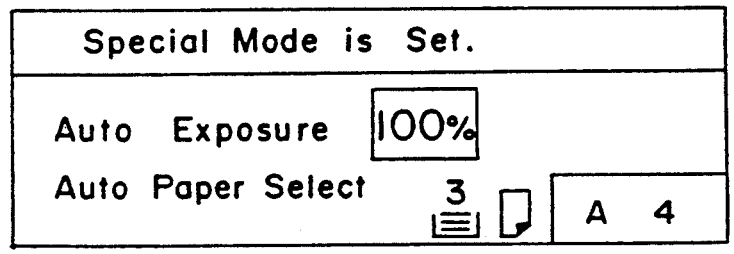
Figure 9C:
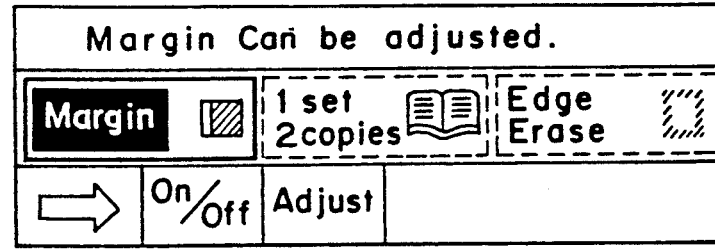
Figure 9D:
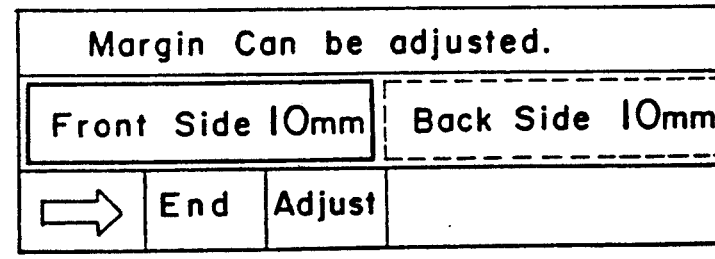
Figure 9E:
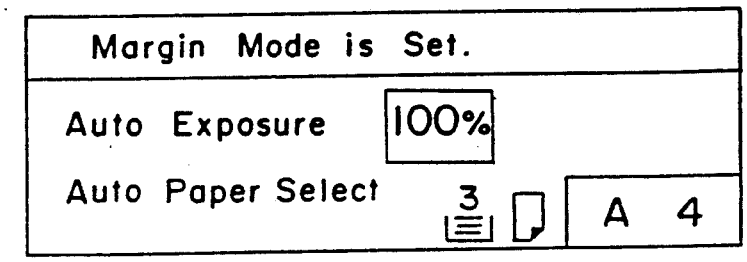
Figures 10D, 10E, 10F, 10G:
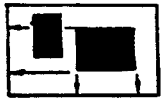
Figure 11A:
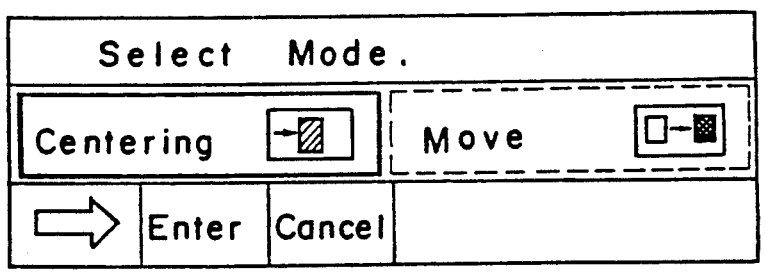
FIGS. 11a to 11f are plan views illustrating the display panel during the setting of the move function.
Figure 11B:
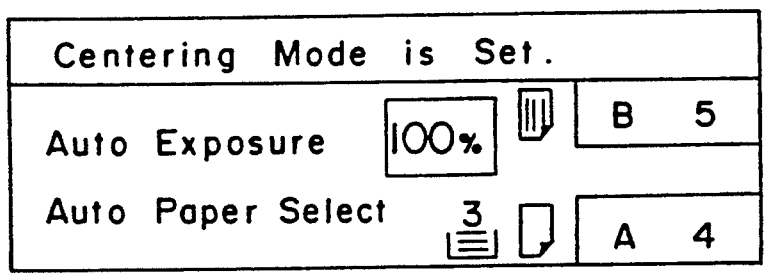
Figure 11C:
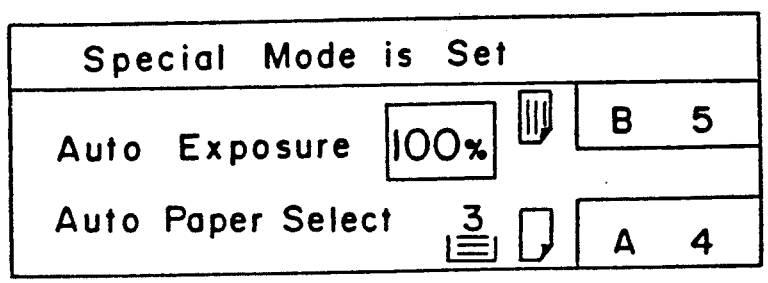
Figure 11D:
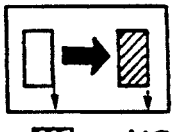
Figure 11E:
Figure 11F:

In the adjustment subroutine (FIG. 3f-1), if the margin shift mode is selected (step n81-1) in a manner described above, the display panel 52 displays the message illustrated in FIG. 9a (step n82) for the time allowed by the timer T. Next, the message in FIG. 9b is displayed (step n84). Then, by operating the special function mode key 62, the message in FIG. 9c is displayed, and adjustment of the margin shift is awaited (steps n85 and n87). At this time, the letters for the margin are displayed with an a reverse highlight display as illustrated in FIG. 9c, making it easier to confirm that the margin shift function has been selected. If from this state level adjustment key 58, which is the adjustment key at this point, is operated, the display panel 52 displays the message illustrated in FIG. 9d (step n88). While the message illustrated in FIG. 9d is displayed, the margin shift amount for front and back side copies can be set to any desired value using level adjustment keys 56 and 58 (steps n89 and n90). When the setting is completed, the level adjustment key 57, the END key at this point, is operated. When the level adjustment key 57 is operated, the display panel 52 displays the message illustrated in FIG. 9e for the time counted by the timer T, and then, the display panel 52 displays the massage illustrated in FIG. 9b, and the procedure for the adjustment subroutine ends. Thereafter, the standby mode is resumed. Thus, when the margin shift function is selected, operation of the special function mode key 62 accepts adjustment and input of the margin shift amount.

(iv) Other special functions mode

If the move/centering function is selected in the adjustment subroutine (FIG. 3f-2), the display panel 52 successively displays the messages illustrated in FIGS. 11a to 11f (steps n96, n107, n109, n103 and n105), and selection of the centering function (step n97) or input of the move amount (step n100) is accepted.

Furthermore, if the trimming/masking function is selected in the adjustment subroutine (FIG. 3f-3), the display panel 52 successively displays the message illustrated in FIGS. 10a to 10g (steps n111, n116, n119, n121, n127, n126 and n129), and input of the area data (steps n117, n122) required for trimming/masking function processing is accepted.

Moreover, if the cover page placement function is selected (FIG. 3f-4), the display panel 52 successively displays the messages illustrated in FIGS. 12a to 12d (steps n131, n138 and n137), so that the data for placing the front cover and/or the back cover may be inputted (step n132). Also, a copy may be made on the front cover, if required (step n139).

Figure 12E:
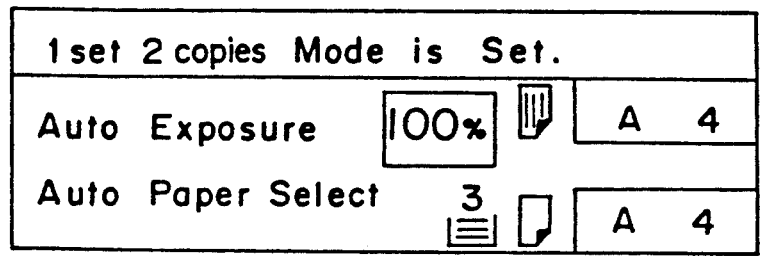
Figure 12F:
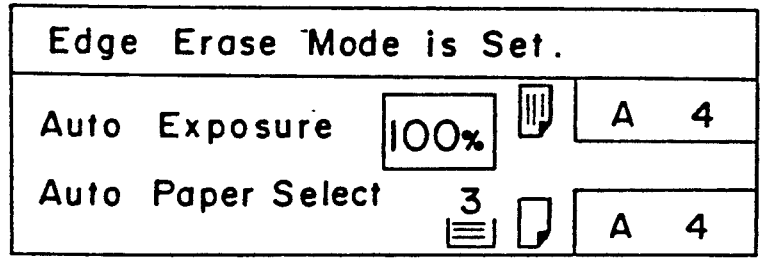
Figure 12G:
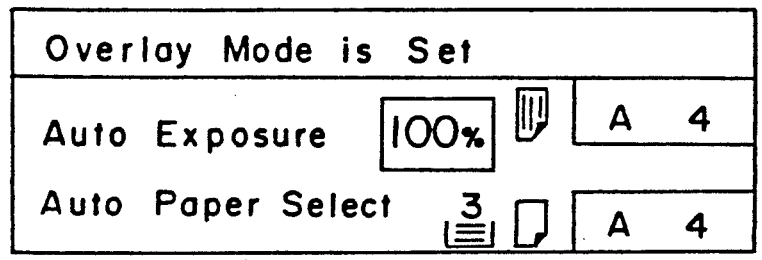

Furthermore, if any one of the book copy (1 set 2 copy) function, the edge erase function or the overlay function is selected (FIG. 3f-5), the display panel 52 displays the messages illustrated in FIG. 12e, 12f or 12g, respectively (step n143, n148 or n152). And then, the display panel 52 displays the message illustrated in FIG. 12d (step n145, n150 or n154), and the procedure for the adjustment subroutine ends. Thereafter, the standby mode is resumed.

(v) Select key pause processing

Figure 3G:
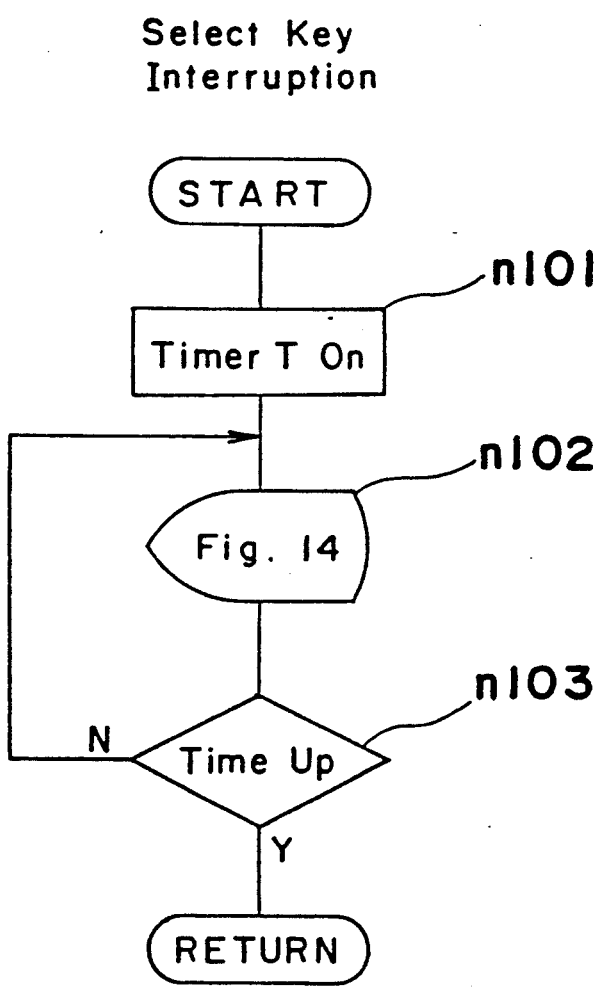
Figure 4:
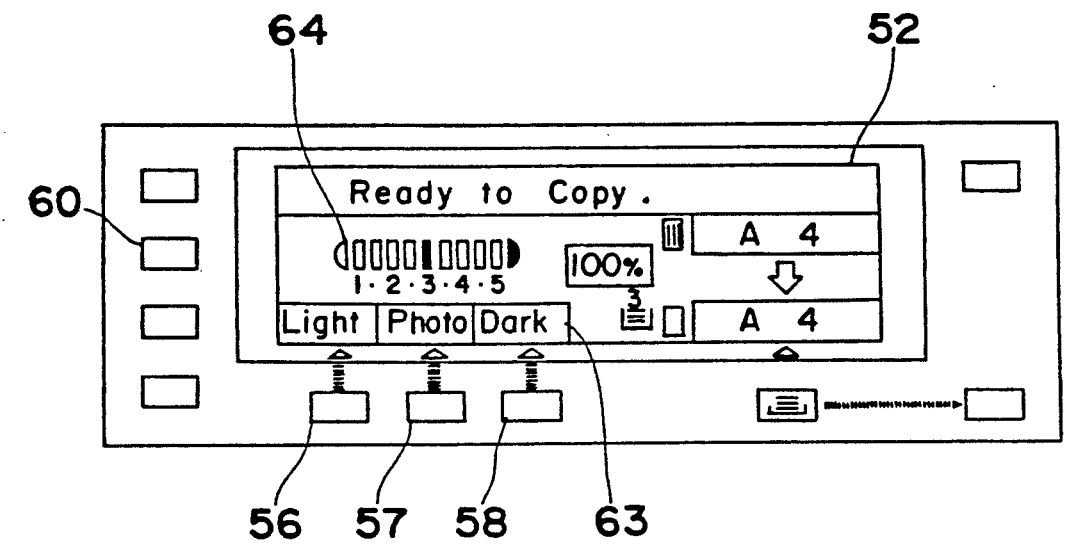
FIG. 4 is a plan view illustrating the display panel in the copy density adjustment mode.
Figure 5:
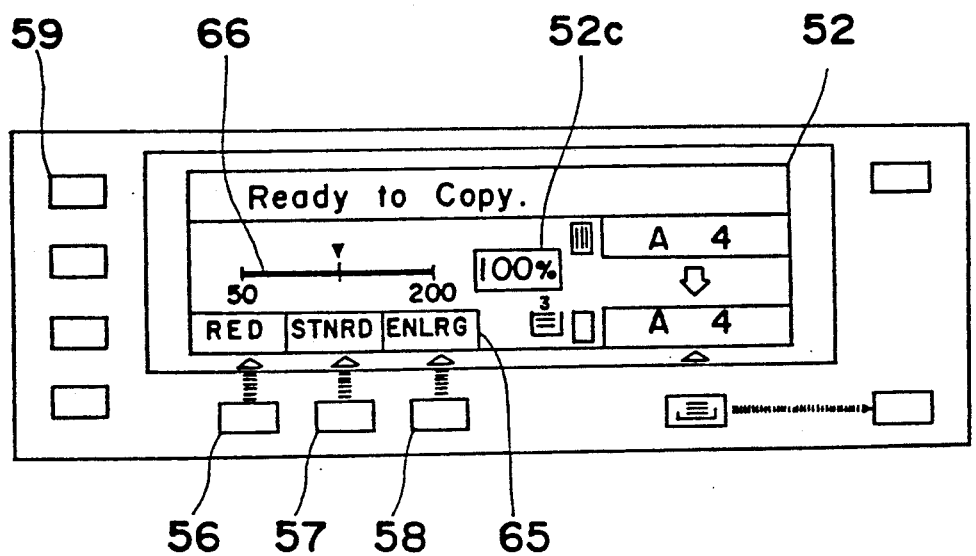
FIG. 5 is a plan view illustrating the display panel in the cop ratio setting mode.

If the confirm key 53 is operated during input processing of the special functions as illustrated in FIG. 3f, an interruption procedure illustrated in FIG. 3g is executed. Specifically, the display panel 52 displays the contents as illustrated in FIG. 14 for the time allowed by the timer T. This makes it easier for the operator to confirm the current density and copy ratio settings.

It is to be noted that the present invention can function in a similar manner when devices not shown in the figures are installed to the copier 1 and functions other than those hereinbefore described are selected. Furthermore, it is possible to write to nonvolatile memory the installation condition of an RADF or other devices at the time of delivery to the user so that only those functions which can be executed during function selection and setting are displayed, or to detect the installation condition of such devices at the execution of each function.

In an imaging apparatus according to the present invention, when image processing functions are input and set, the operator is able to confirm the function that has been selected, and also to search for the desired image processing functions which are functionally related, thus making it easier to select the desired image processing functions from among multiple image processing functions. Thus, the procedure for inputting and setting image processing functions can be simplified, and the time required for the procedure can be reduced.

(7) Modification

Figure 15A:
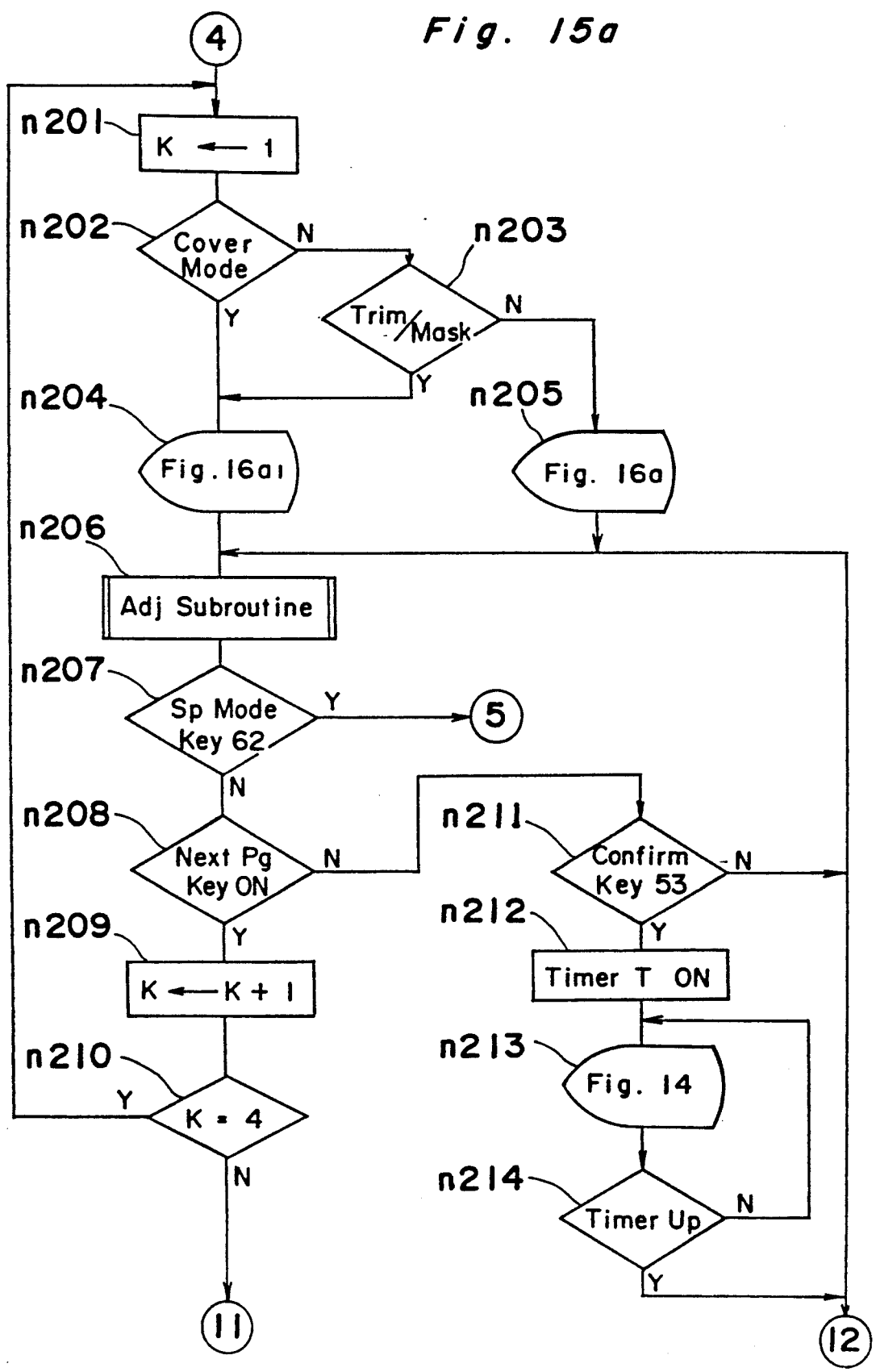
FIGS. 15a and 15b is a flow chart which is a modification of the flow chart illustrated in FIG. 3e.
Figure 15B:
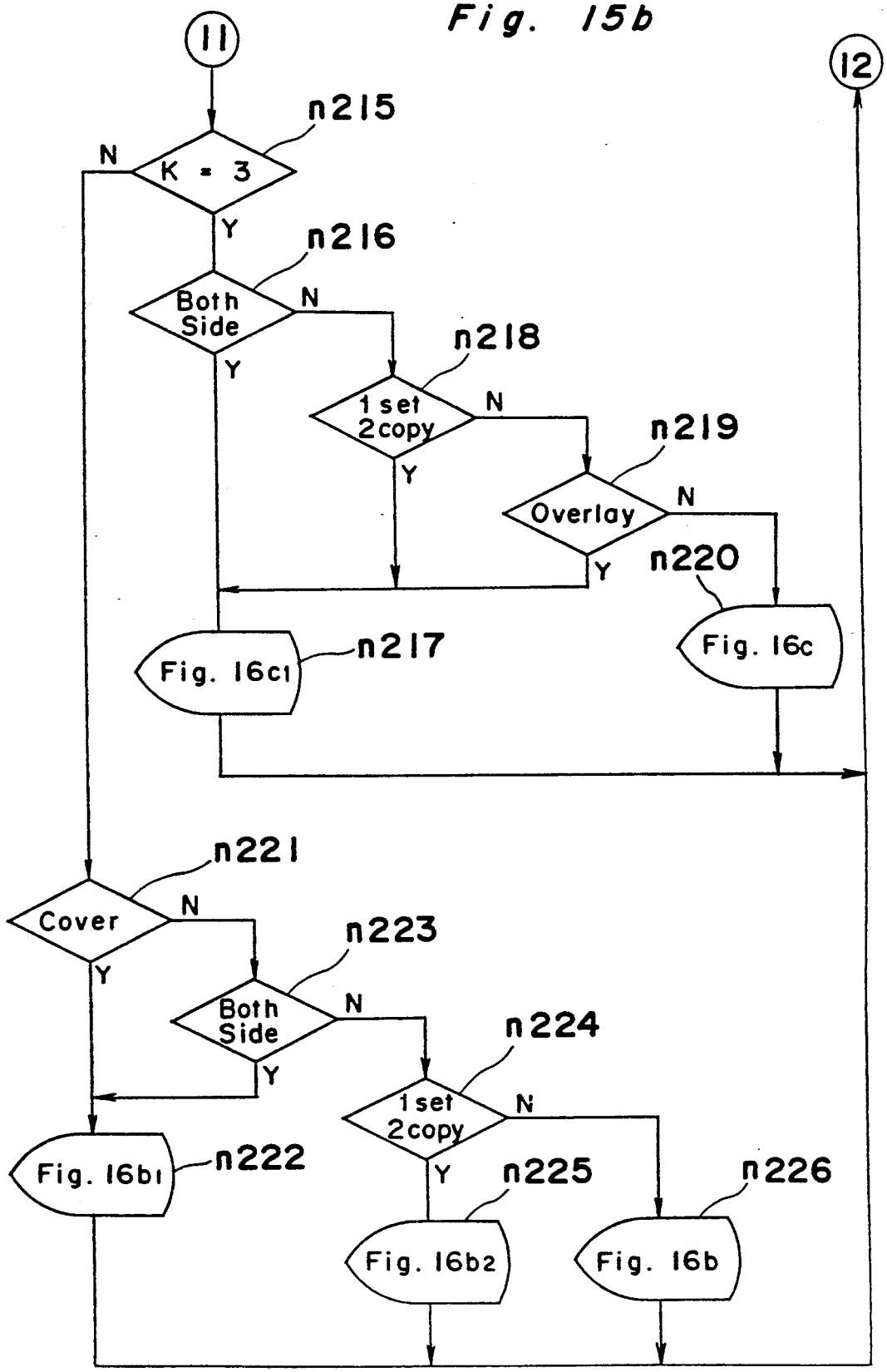

Referring to FIGS. 15a and 15b, a flow chart, which is a modification of the flow chart in FIG. 3e, is provided.

When the special function mode key 62 is operated, the contents of the counter K for counting the number of operations of the level adjustment key 58 are first set to 1 (step n201). Next, it is determined whether the cover page placement function has been set (step n202). If not, it is further determined whether the trimming-/masking function has been set (step n203). If the trimming/masking function has not been set, the display panel 52 displays the message illustrated in FIG. 16a, and if either the cover page placement function or the trimming/masking function has been set, the display panel 52 displays the message illustrated in FIG. 16a1 (step n204). Then, the adjustment subroutine described above in connection with FIG. 3f is effected (step n206), and the special mode key 62 is checked. If the special mode key 62 is not depressed, the program goes to step n208. If at this stage, the level adjustment key 58 corresponding to the next page key is operated (step n208), the counter K is immediately incremented (step n209), and the content of the counter K is immediately checked (step n210). If the content of the counter K is 3, it is checked whether the both side copy function, the book copy (1 set, 2 copy) function, or overlay the copy function is set. If none of these functions is set, display the panel 52 displays the message illustrated in FIG. 16b3 (step n220). If the content of the counter K is 3 and either the both side copy function, the overlay copy function, or the book copy (1 set, 2 copies) function is set, the display panel 52 displays the message illustrated in FIG. 16c (n217). Thereafter, the program can reenter the adjustment subroutine. If the content of the counter K is 4 (step n210), the procedure returns to step n201.

If the content of the counter K is 2, it is checked whether the cover page placement function is set (steps n221), whether the both side copy function is set (step n223), or whether the book copy (1 set 2 copies) function is set (step n224). If the cover page placement function is set, or the both side copy function is set, the display panel 52 displays the message illustrated in FIG. 16b1 (step n222). If the book copy (1 set 2 copies) function is set, the display panel 52 displays the message illustrated in FIG. 16b2 (step n225). Furthermore, if neither the cover page placement, the both side copy, or the book copy (1 set, 2 copies) function is set, the display panel 52 displays the message illustrated in FIG. 16b (step n226).

Thus, if special function mode key 62 is operated, the display panel 52 displays the message illustrated in FIG. 16a, 16a1, 16b, 16b1, 16b2 or 16c. For example, if no function has been set, the display panel 52 displays the messages illustrated in FIG. 16a, 16b or 16c, each time the level adjustment key 58 is operated. The operator is able to set the desired special functions by operating level keys 56 and 57 while the contents of FIGS. 16a, 16b and 16c are displayed. The contents of FIG. 16a correspond to functions executed for copying bound originals such as a book. The contents of FIG. 16b correspond to functions required to enter the image area. Because related functions are displayed together, the operator can more easily select the functions to be executed.

According to this modification, previously set modes and functions are stored at a specific address in the RAM 73, and functions which cannot be simultaneously executed with another function which has already been set are not displayed on the display panel 52.

Due to the aforementioned processing, unexecutable functions are not displayed by the display panel 52, and the operator cannot mistakenly enter and set an unexecutable function.

As illustrated in FIG. 17, taking the additional functions, i.e., stapling, punching, Z fold/two fold, Mark/stamp, into consideration, the functions, which can or cannot, in principle, be used simultaneously, are illustrated.

In an imaging apparatus according to the present invention, during the input and entry of image processing functions, only those image processing functions which can be executed simultaneously with those multiple image processing functions which have already been input and set are displayed on the display section. Therefore, those image processing functions which cannot be executed are not displayed during image processing function entry, and the operator cannot select functions which are thus unexecutable. Thus, displays notifying the operator after function entry is completed that the image processing functions cannot be executed are not displayed, and there are no feelings of operator frustration. Furthermore, the entry procedure for data related to image processing function settings is not wasted, and the time required for input settings is reduced.

Furthermore, in an imaging apparatus according to the present invention, when a specific input key is operated during input and setting of image processing functions on one display screen, functions input and set on another display screen are displayed on the display section. Thus, the operator can easily confirm the image processing functions previously set on another display screen, and entry of unexecutable image processing functions can be prevented.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An imaging apparatus comprising:
   a plurality of image processing functions which are classified at least into a first group including a plurality of first related functions and a second group including a plurality of second related functions;
   group selection means for selecting one of said groups of related functions;
   display means for displaying a portion of related functions for said one selected group which is selected by said group selection means;
   function selecting means for selecting from said portion of related functions for said one selected group displayed in said display means; and
   listing means for listing said portion of related functions for said one selected group in said display means for confirming said portion of related functions selected by said group selecting means;
   said portion of related functions comprising a display function for displaying the remaining portions of said one selected group of related functions in said display means.

2. An imaging apparatus as claimed in claim 1, wherein said one selected related function other than said display function is displayed distinguishably in said display means, and the remaining related functions which fail to be selected remain displayed for a subsequent selection by said function selecting means.

3. In an imaging apparatus comprising a plurality of image processing functions which can be classified at least into a first group including a plurality of first related functions and a second group including a plurality of second related functions, a method for selecting the functions comprising the steps of:
   (a) selecting one of said first and second groups of related functions;
   (b) displaying a portion of related functions for said one selected group which is selected at said step (a);
   (c) selecting from said portion of related functions for said one selected group displayed at said step (b);
   (d) listing said portion of related functions for said one selected group and displaying the listing for confirming said portion of related functions selected at said step (c); and
   (e) displaying the remaining portions of said selected group of related functions in place of said portion of related functions in response to a display function selected at said step (c).

4. An imaging apparatus comprising:
   image processing means having a plurality of image processing functions which are classified into a plurality of groups of related image processing functions included in said plurality of image processing functions;
   group selecting means for selecting one of said plurality of groups of related image processing functions;

display means for displaying a portion of said related image processing functions of said one group selected by said group selecting means;

function selecting means for selecting from said portion of said related image processing functions of said one group displayed by said display means; and listing means for listing said portion of said related image processing functions of said one group in said display means for confirming said portion of said related image processing functions selected by said group selecting means; said portion of said related image processing functions comprising a display function for displaying the remaining portions of said related image processing functions for said one group in place of said portion of said related image processing functions.

5. An imaging apparatus as claimed in claim 4, wherein a related image processing function selected by said function selecting means other than said display function is distinguishably displayed on said display means and the remaining related image processing functions of said one group remain displayed for a subsequent selection by said function selecting means.

* * * * *

UNITED STATES PATENT AND TRADEMARK OFFICE
CERTIFICATE OF CORRECTION

PATENT NO. : 5,192,942

DATED : March 9, 1993

INVENTOR(S) : Yoshikado YAMADA, Kimihito YAMASAKI, Syochiro YOSHI-URA, Kazuyuki OGITA and Osamu IWASA It is certified that error appears in the above-identified patent and that said Letters Patent is hereby corrected as shown below:

On the title page, item (63):
 Please add: Related U.S. Application Data on page 1, col. 1, line 9 at item (63) as follows:

--Cont. of SN: 07/286,868 filed December 20, 1988--

Signed and Sealed this

Fifth Day of April, 1994

Attest:

BRUCE LEHMAN

Attesting Officer

Commissioner of Patents and Trademarks